April 30, 1935. W. HULL 1,999,876
DOMESTIC CENTRAL POWER PLANT
Filed Aug. 9, 1930 14 Sheets-Sheet 1

Inventor
Warren Hull
By Charles L. Reynolds
Attorney

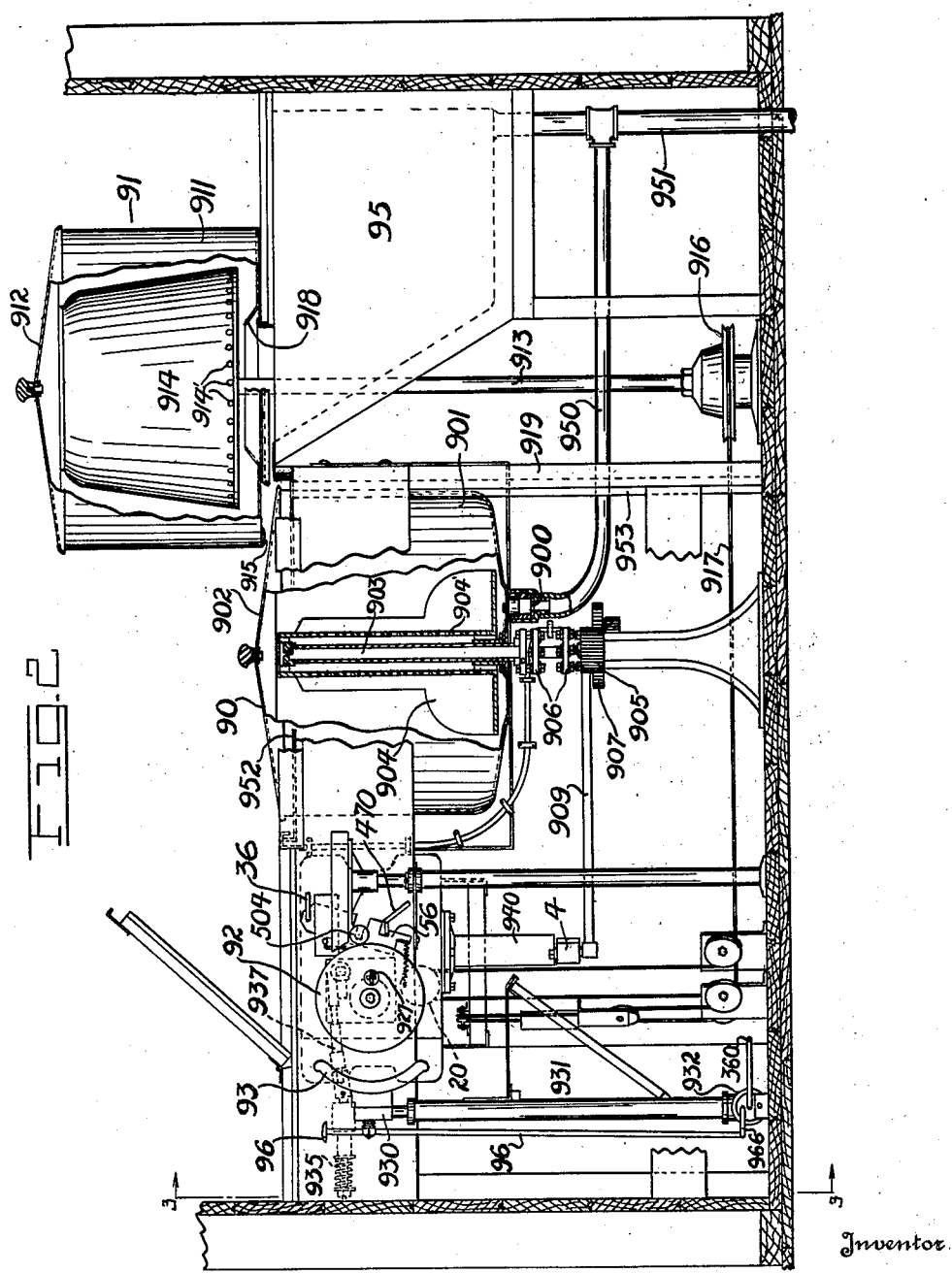

April 30, 1935.  W. HULL  1,999,876
DOMESTIC CENTRAL POWER PLANT
Filed Aug. 9, 1930   14 Sheets-Sheet 3
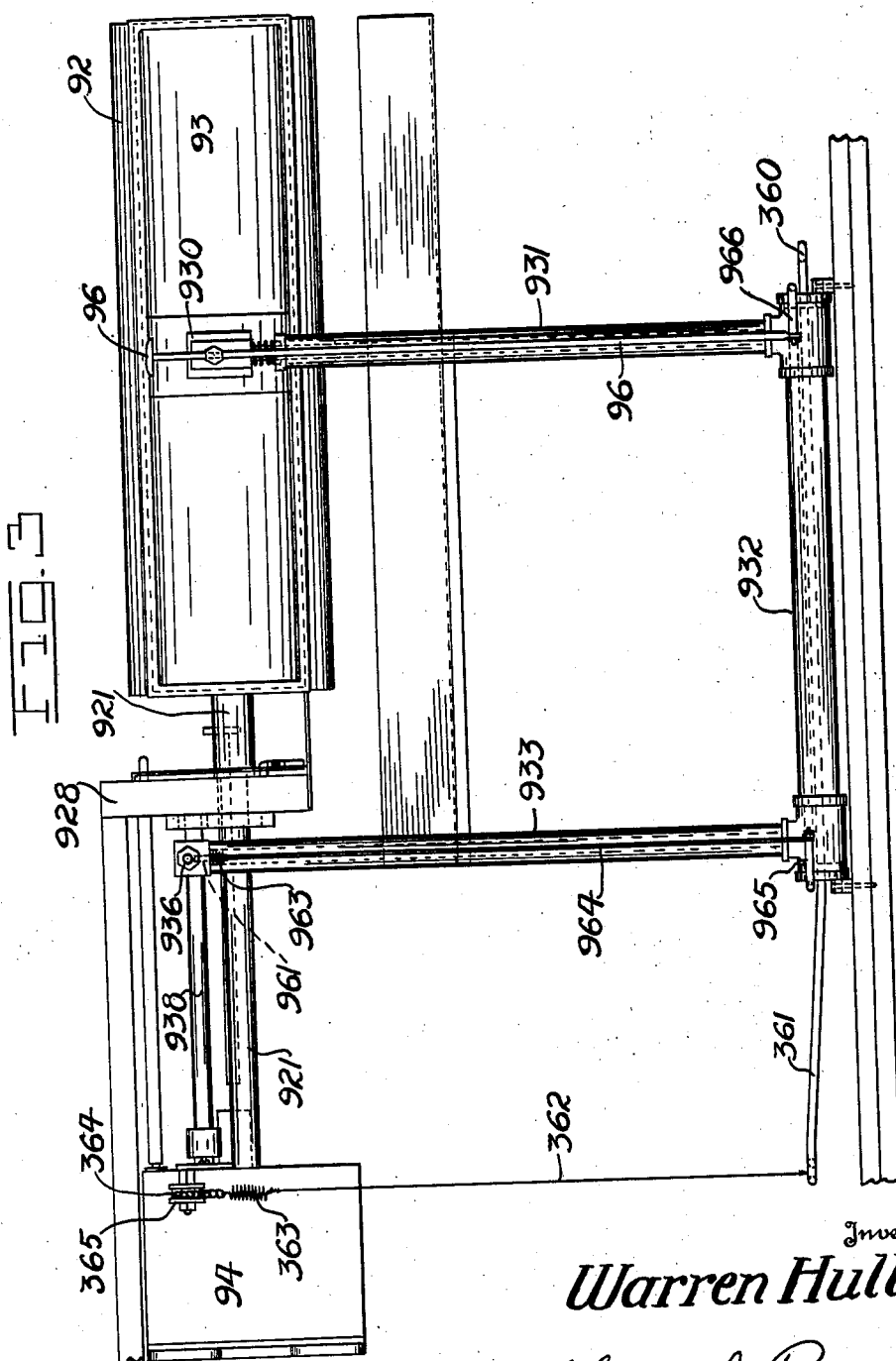
Inventor
*Warren Hull*
By *Charles L. Reynolds*
Attorney

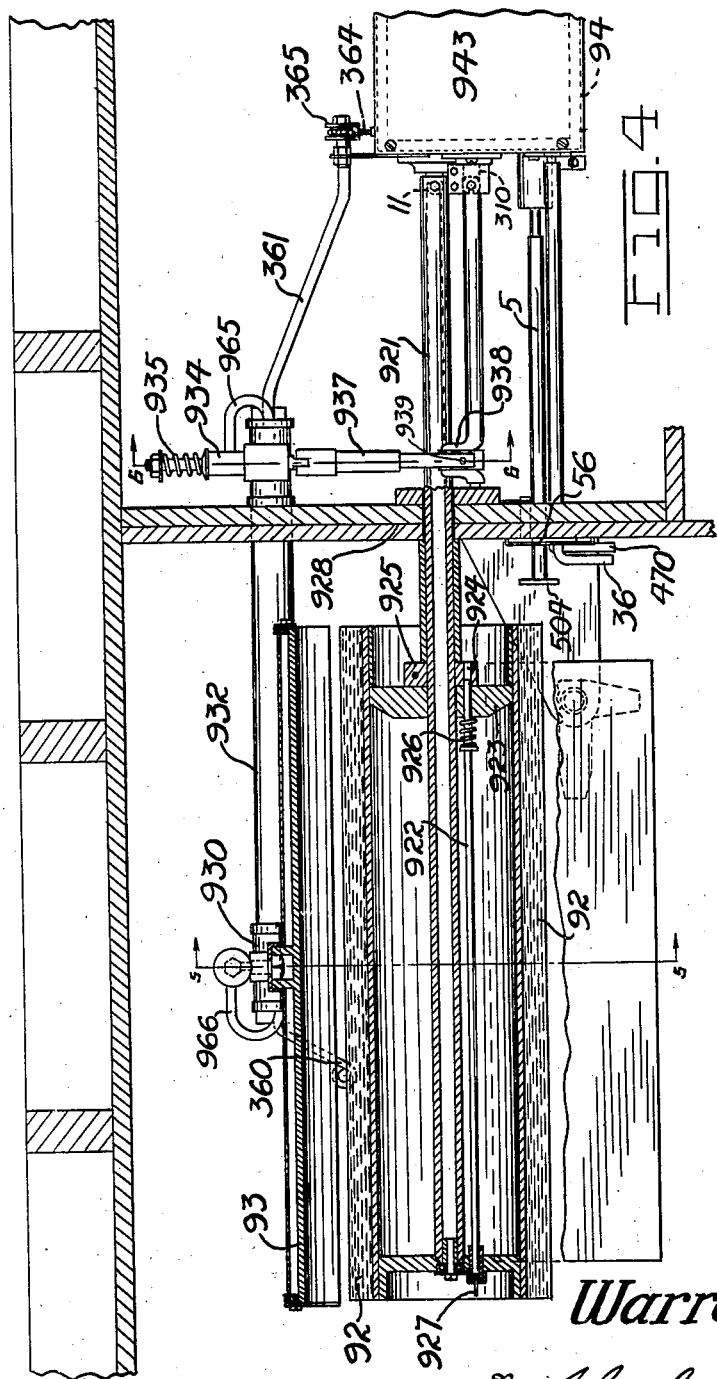

April 30, 1935. W. HULL 1,999,876
DOMESTIC CENTRAL POWER PLANT
Filed Aug. 9, 1930 14 Sheets-Sheet 5
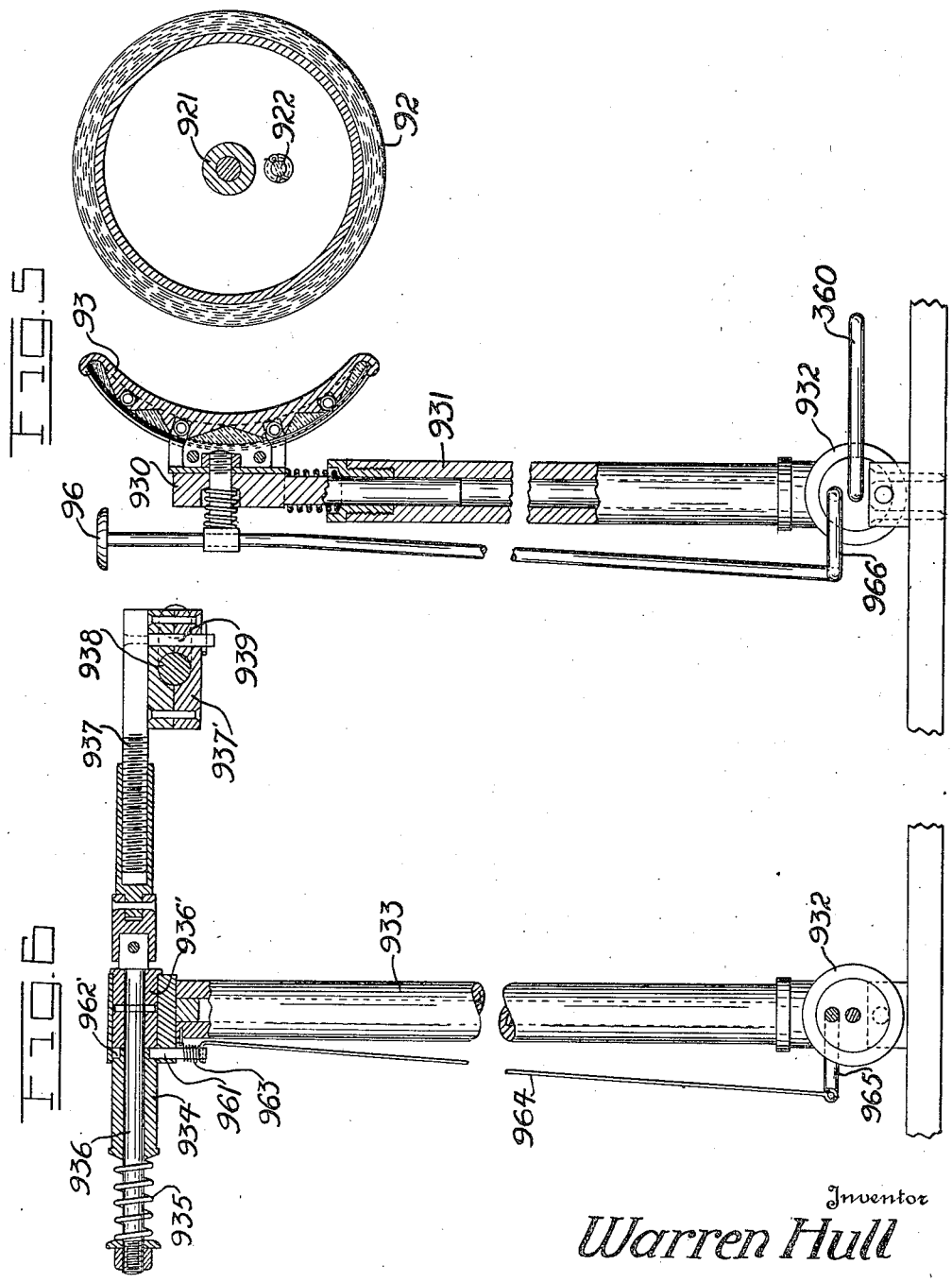
Inventor
Warren Hull
By Charles L. Reynolds
Attorney

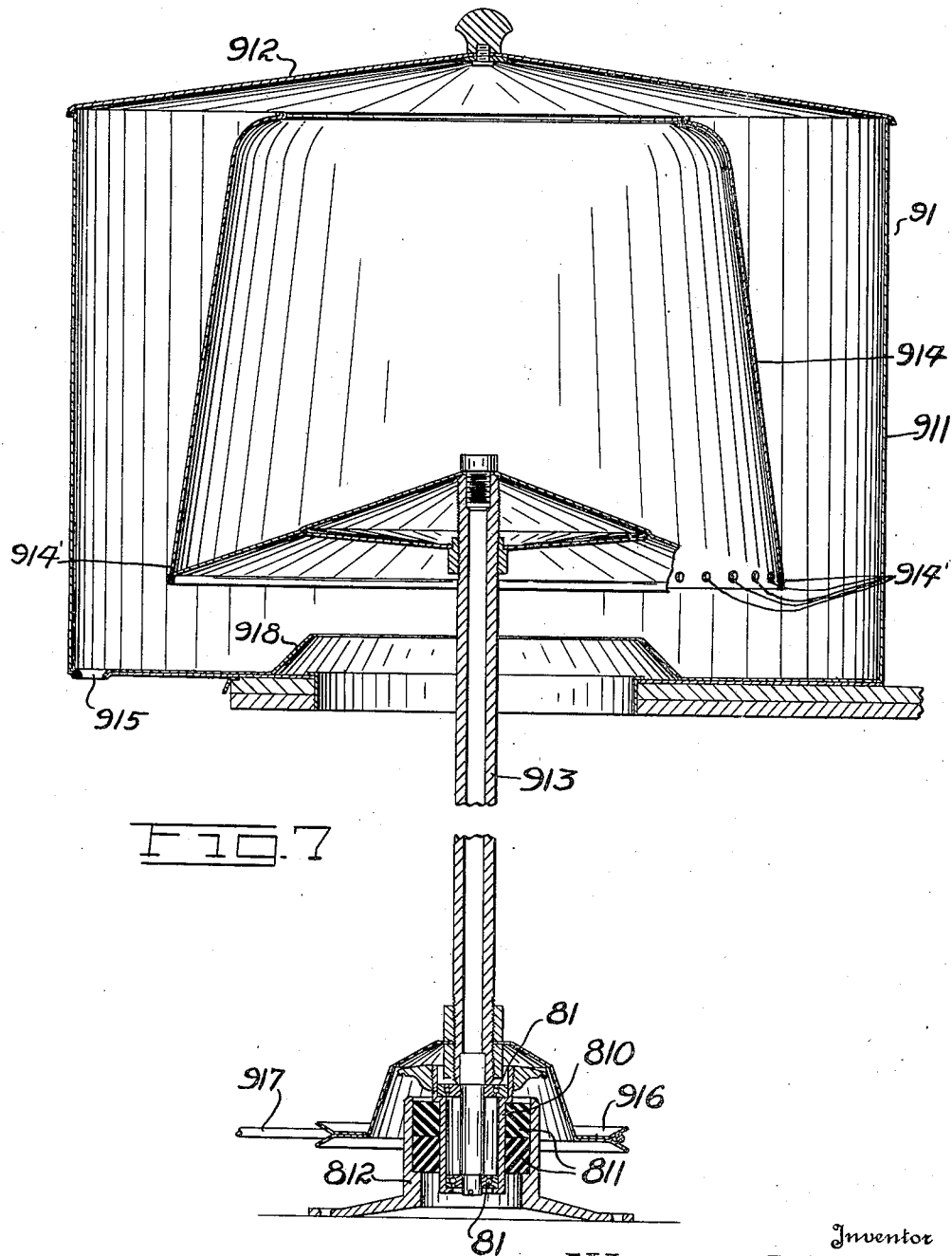

April 30, 1935.  W. HULL  1,999,876
DOMESTIC CENTRAL POWER PLANT
Filed Aug. 9, 1930  14 Sheets-Sheet 7
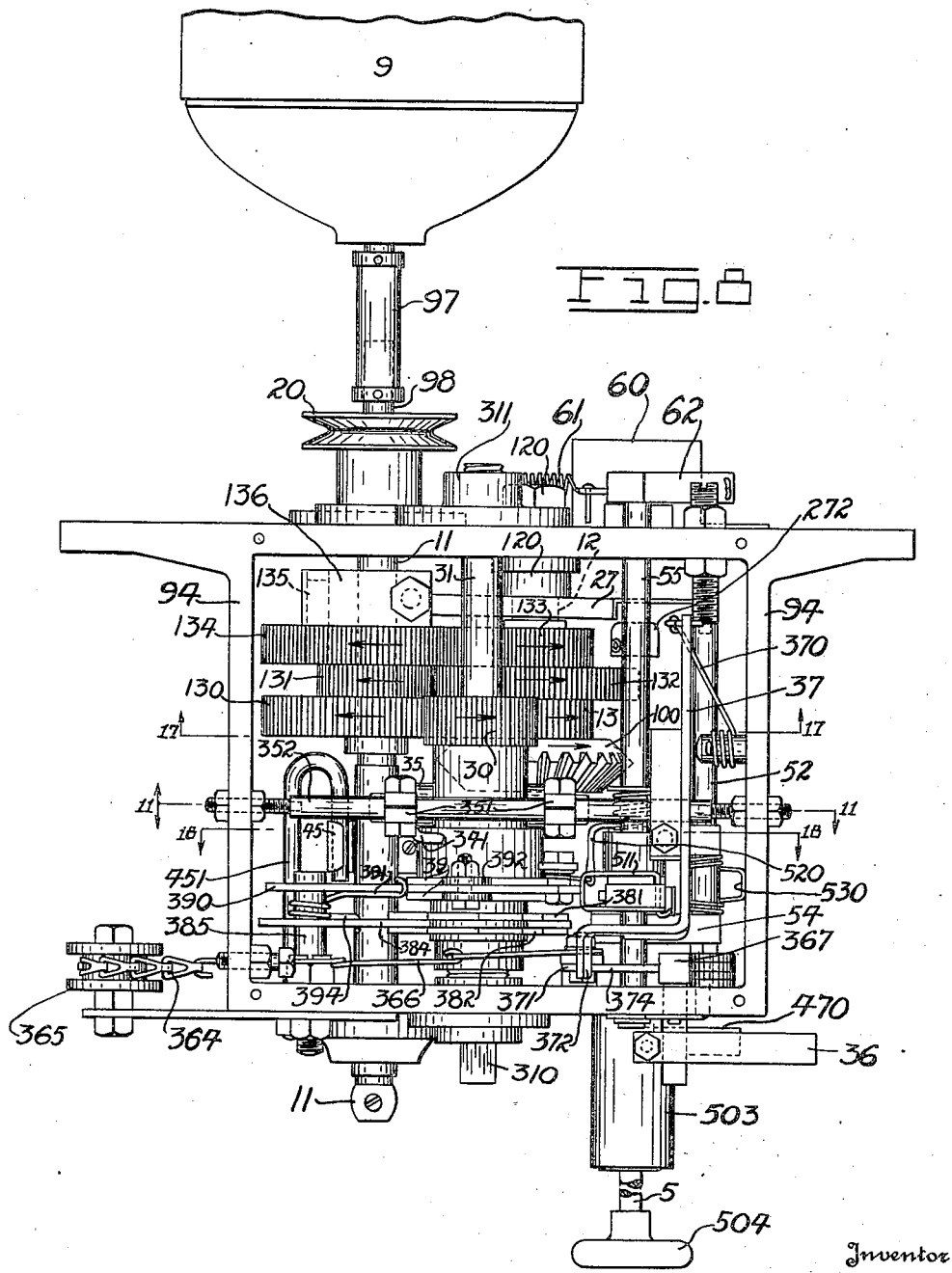
Inventor
*Warren Hull*
By *Charles L. Reynolds*
Attorney

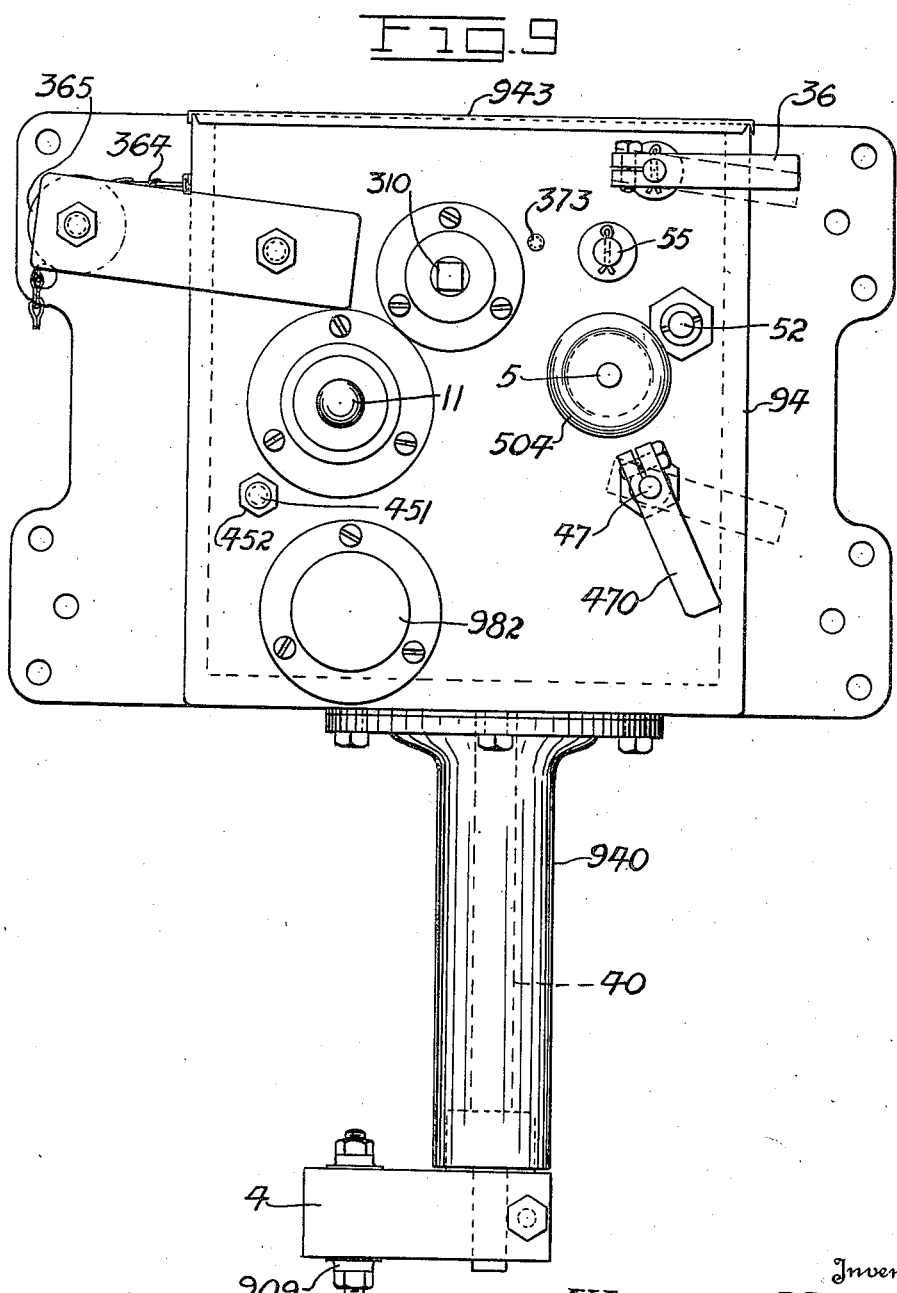

April 30, 1935. W. HULL 1,999,876
DOMESTIC CENTRAL POWER PLANT
Filed Aug. 9, 1930 14 Sheets-Sheet 9
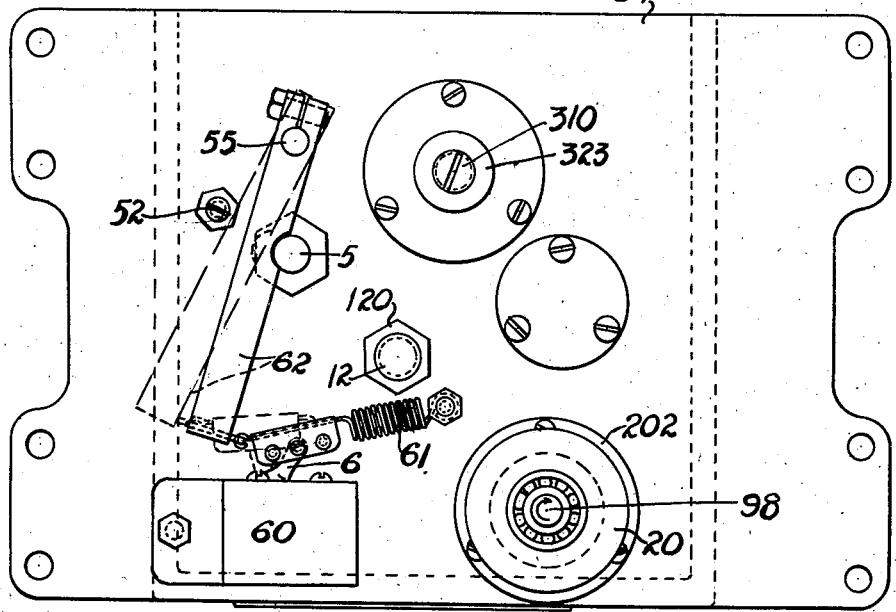
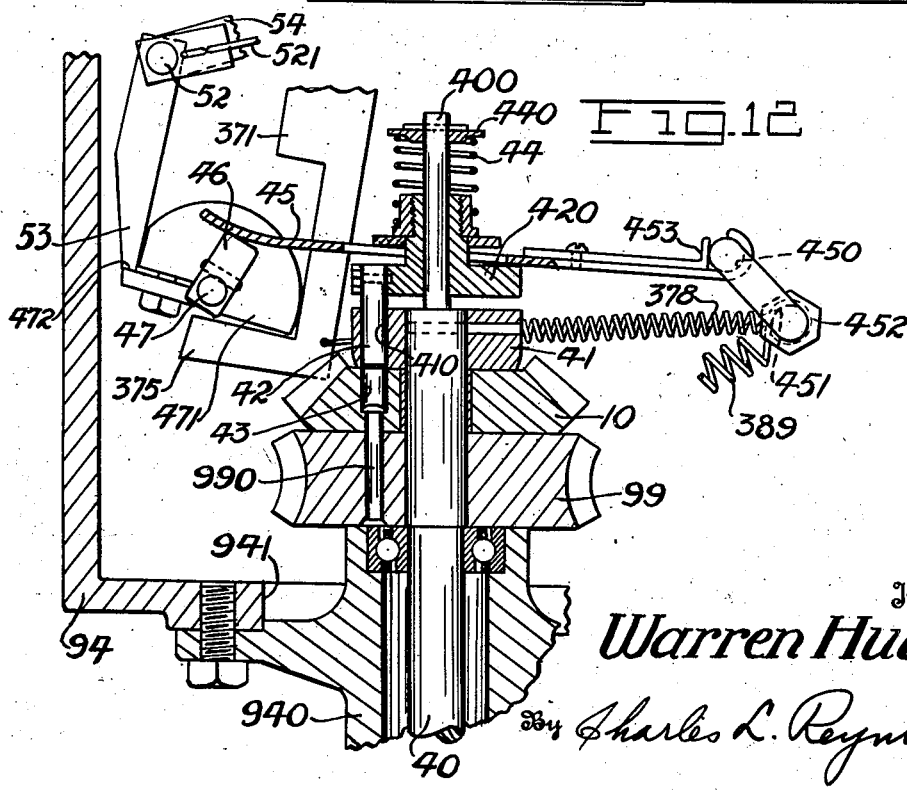
Inventor
Warren Hull
By Charles L. Reynolds
Attorney

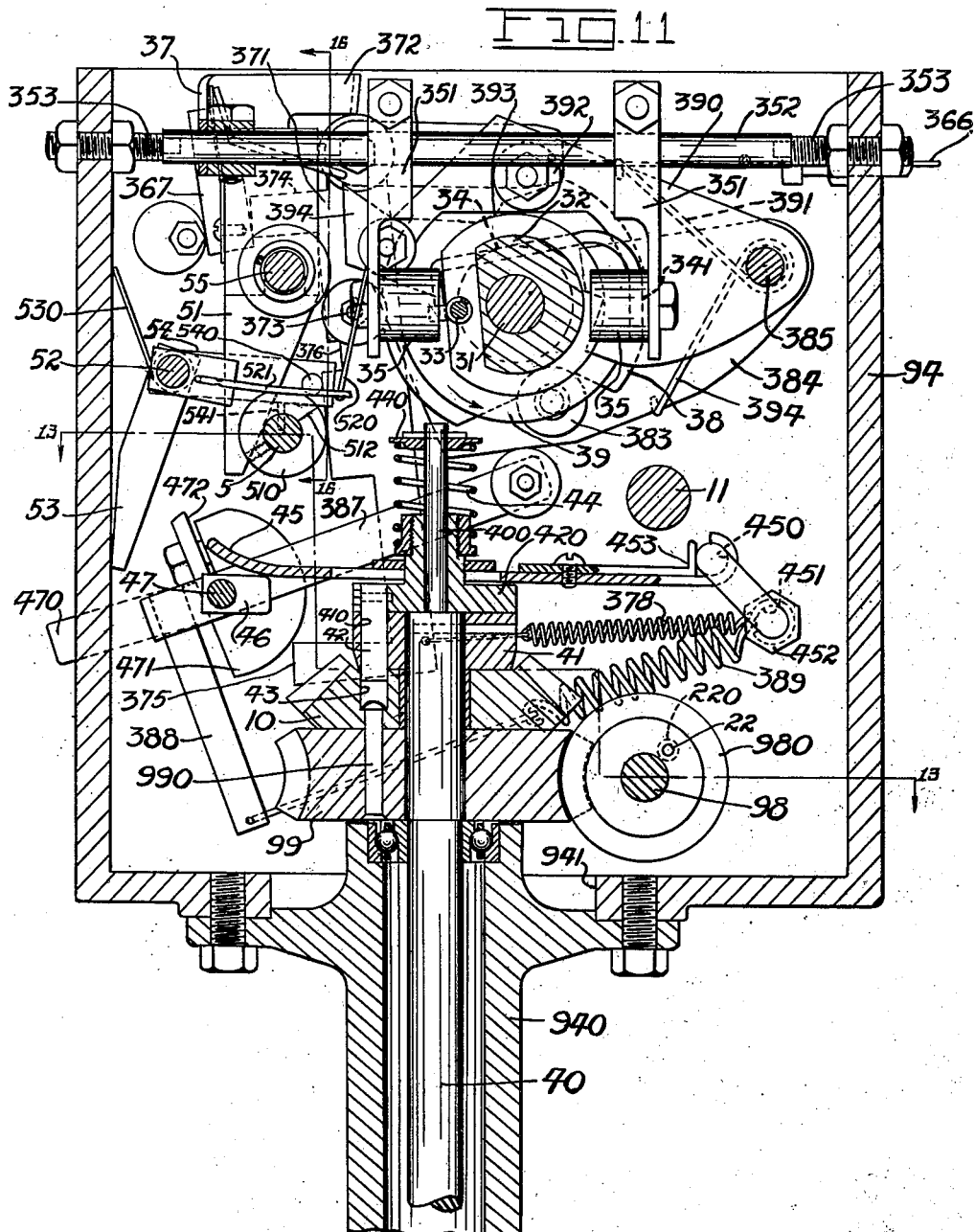

April 30, 1935.    W. HULL    1,999,876
DOMESTIC CENTRAL POWER PLANT
Filed Aug. 9, 1930    14 Sheets-Sheet 11
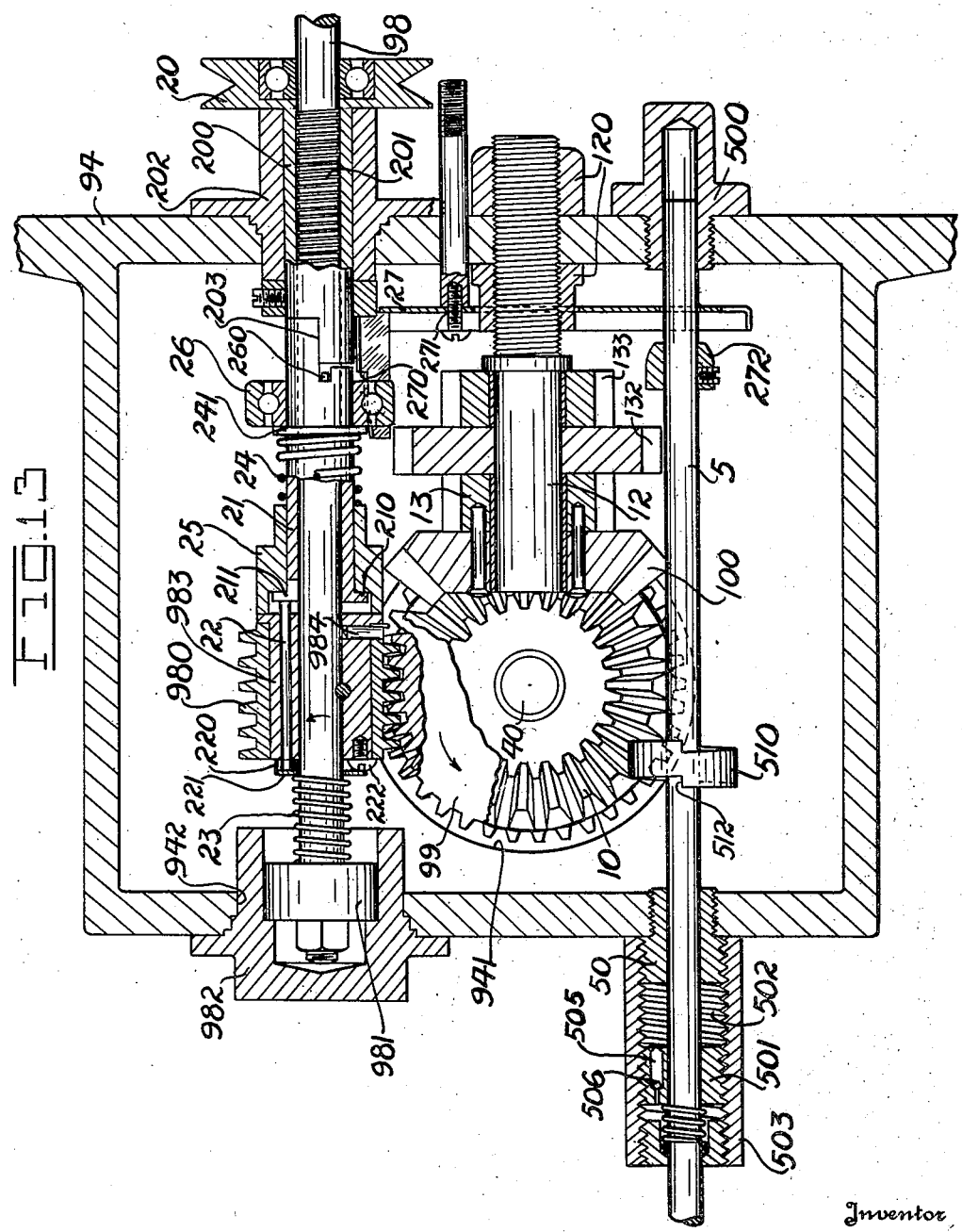
Inventor
*Warren Hull*
By *Charles L. Reynolds*
Attorney April 30, 1935. W. HULL 1,999,876
DOMESTIC CENTRAL POWER PLANT
Filed Aug. 9, 1930 14 Sheets-Sheet 12
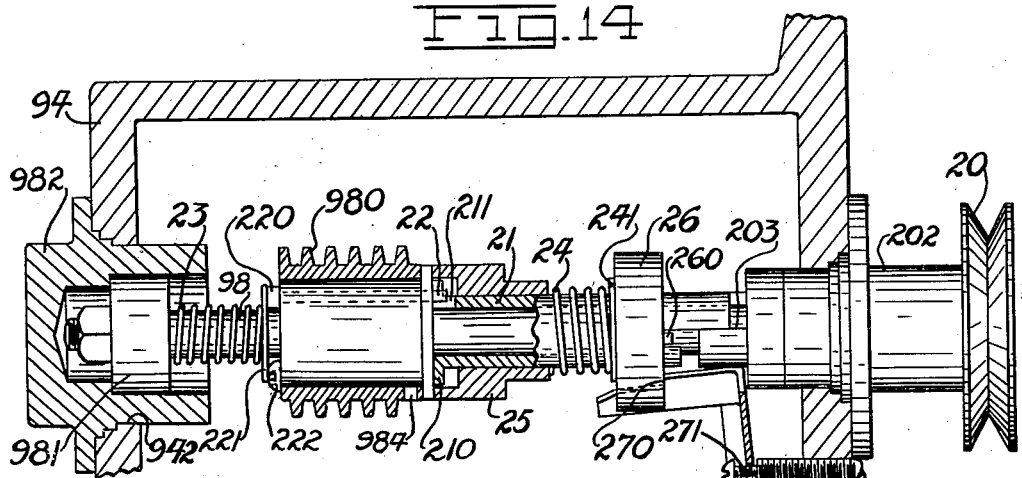
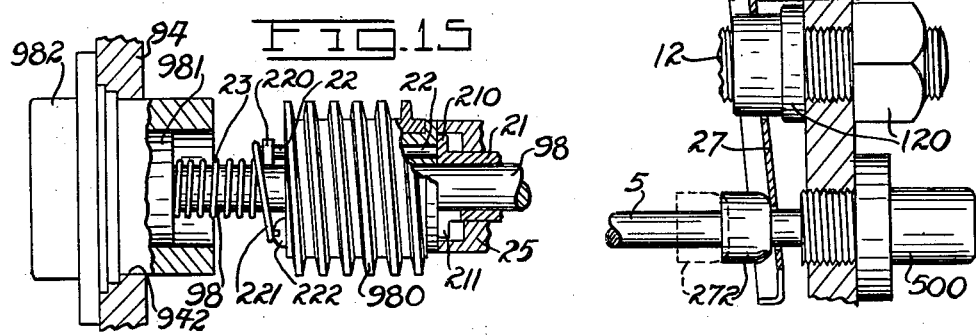
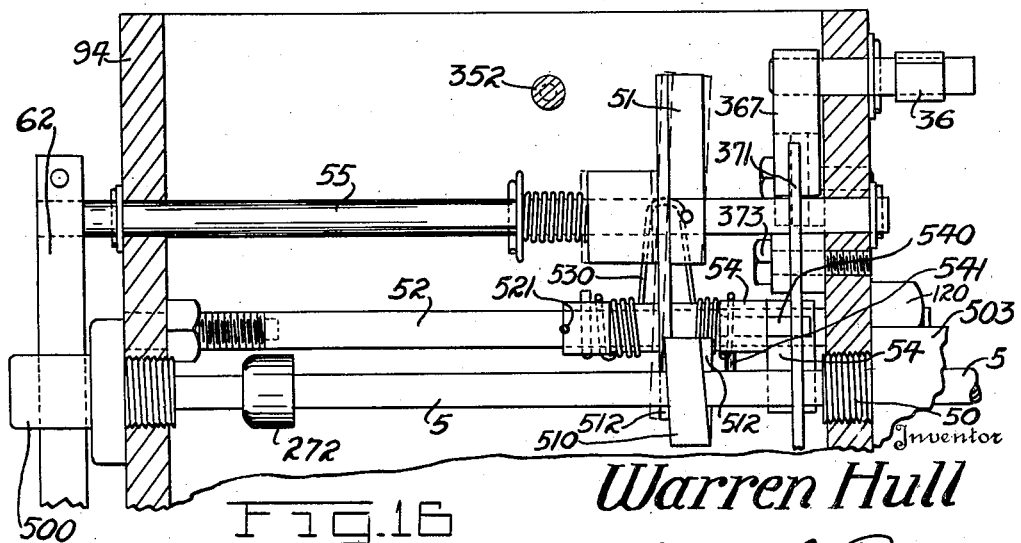
Inventor
Warren Hull
By Charles L. Reynolds
Attorney April 30, 1935.  W. HULL  1,999,876

DOMESTIC CENTRAL POWER PLANT

Filed Aug. 9, 1930    14 Sheets-Sheet 13

Inventor
*Warren Hull*
By *Charles L. Reynolds*
Attorney

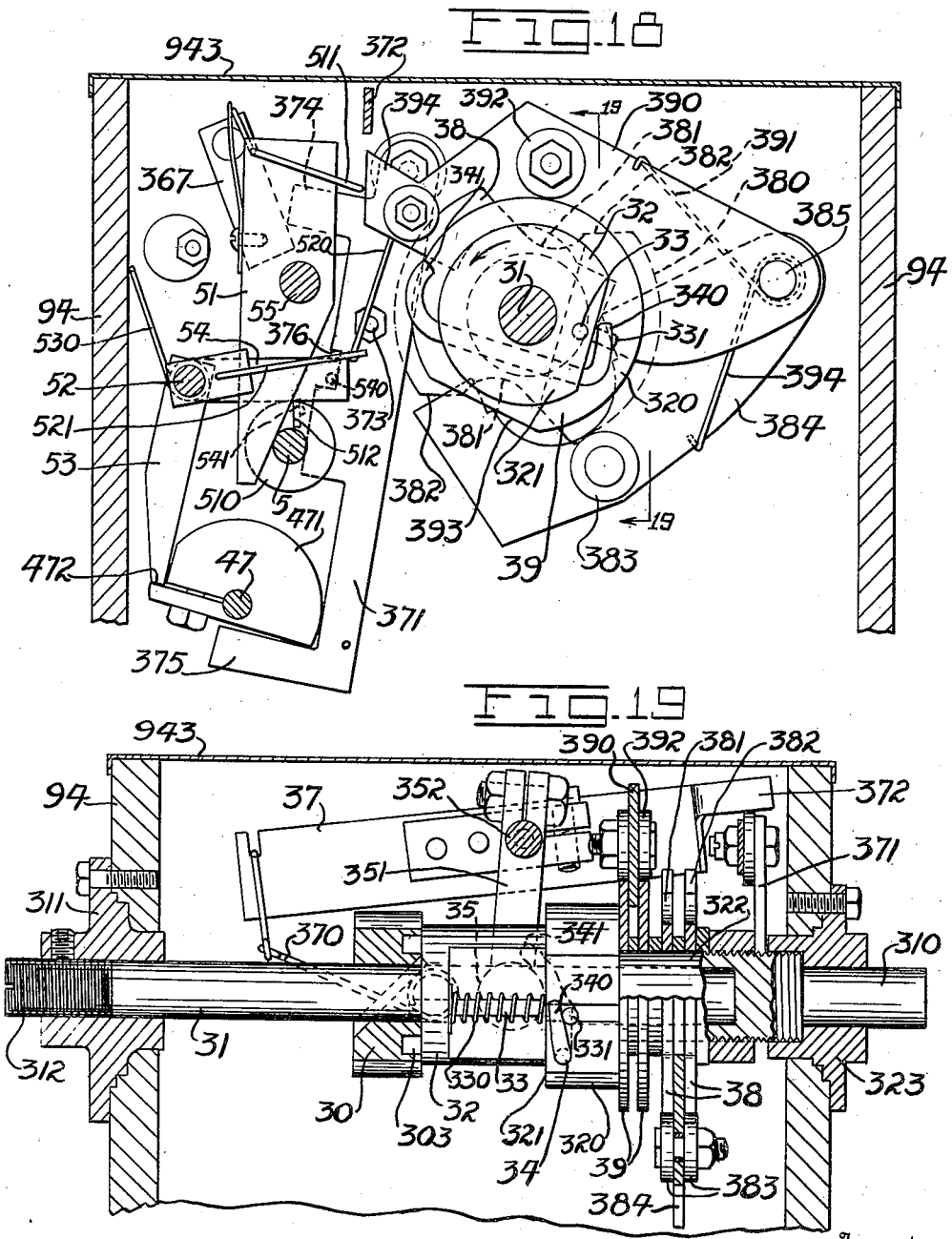

Patented Apr. 30, 1935

1,999,876

UNITED STATES PATENT OFFICE 1,999,876

DOMESTIC CENTRAL POWER PLANT

Warren Hull, Hoquiam, Wash.

Application August 9, 1930, Serial No. 474,246

41 Claims. (Cl. 68—15)

My invention relates to a central power plant intended to be built into individual homes, whereby there may be operated from a single motor a plurality of adjunct machines or working devices, thus eliminating the necessity of using an individual motor, with the attendant gear reductions, casings, frames and the like, for each separate machine or device.

The wiring of homes ordinarily will supply current sufficient to operate a quarter horsepower motor without special wiring, hence my appliance is designed for the employment of such a motor, and various cut-outs or safety devices may be employed to guard against overloading such a motor, by necessitating that certain appliances shall remain inactive while others are being operated. In circumstances where a larger motor is used, such precautions may not be necessary, although it will be but seldom that a motor would be used capable of driving all the devices simultaneously.

In general, my device is illustrated in connection with domestic laundry machinery, such as a clothes washer, a drier, and a mangle. In such a combination it may become necessary to employ certain safety mechanisms, either those referred to above or others, whereby it shall be impossible accidentally to operate certain of such devices, which may be dangerous, and such devices can then be operated only when the operating power is cut off from the other devices. In particular, the mangle is protected from accidental operation, and from being left closed with the heat on, which would create a serious fire hazard.

It is an object of my invention to provide a mechanism for accomplishing the general objects above, which is exceedingly compact, yet which is easily accessible, so that the parts which are especially subject to wear may be removed and quickly replaced without difficulty whenever replacement becomes necessary.

It is a further object to provide a mechanism constructed of parts which are sturdy, and which rely to the smallest extent possible upon fine adjustment, and which are so arranged that the mechanism may be serviced and parts replaced by the ordinary mechanic, working in the home, distant from his shop, with a minimum of difficulty, and without removing the working unit as a whole.

It is also an object to arrange the several driving connections flexibly, and in general, to permit assembly and connection of the several devices in such a way that their operation will not be affected by uneven house settlement.

Other objects, and more especially such as relate to the attainment of a selected sequence of events, or to the automatic cutting out of certain appliances, and such as pertain to the purely mechanical details of my invention, will be best ascertained from a study of the attached drawings, of this specification, and of the claims which terminate the same.

In the accompanying drawings, I have shown my invention in a form which is now preferred by me, it being understood that it may be embodied in various forms within the scope of the appended claims, and that the principles thereof may be adapted to various purposes, without departure from my invention, and that the illustration thereof in association with a domestic laundry plant is purely by way of example. If employed for other purposes, my invention would be provided with analogous safety devices, cut-outs, etc., as needed, and especially adapted to the purposes in mind.

Figure 2 is a front elevation of the same general arrangement, parts being broken away and shown in sections.

Figure 3 is a rear side elevation of the mangle, taken from the viewpoint illustrated by the line 3—3 of Figure 2.

Figure 4 is a plan view of the mangle, parts being shown in section.

Figures 5 and 6 are transverse sections through mangle parts, taken on the respective lines 5—5 and 6—6 of Figure 4.

Figure 7 is a vertical axial section through the drier.

Figure 8 is a general plan view, with the cover plate removed, of the gear and control box for my power plant, and Figures 9 and 10 are respectively front and rear elevations thereof.

Figure 11 is a vertical transverse section on the general line 11—11 of Figure 8, and Figure 12 is a similar sectional view of a portion of the same mechanism.

Figure 13 is an irregular horizontal section along the general line 13—13 of Figure 11, and Figures 14 and 15 are detail sections along the same general section line, illustrating the drier drive mechanism.

Figure 16 is a vertical section, front to rear, of certain control mechanism, taken substantially on the line 16—16 of Figure 11.

Figure 17:
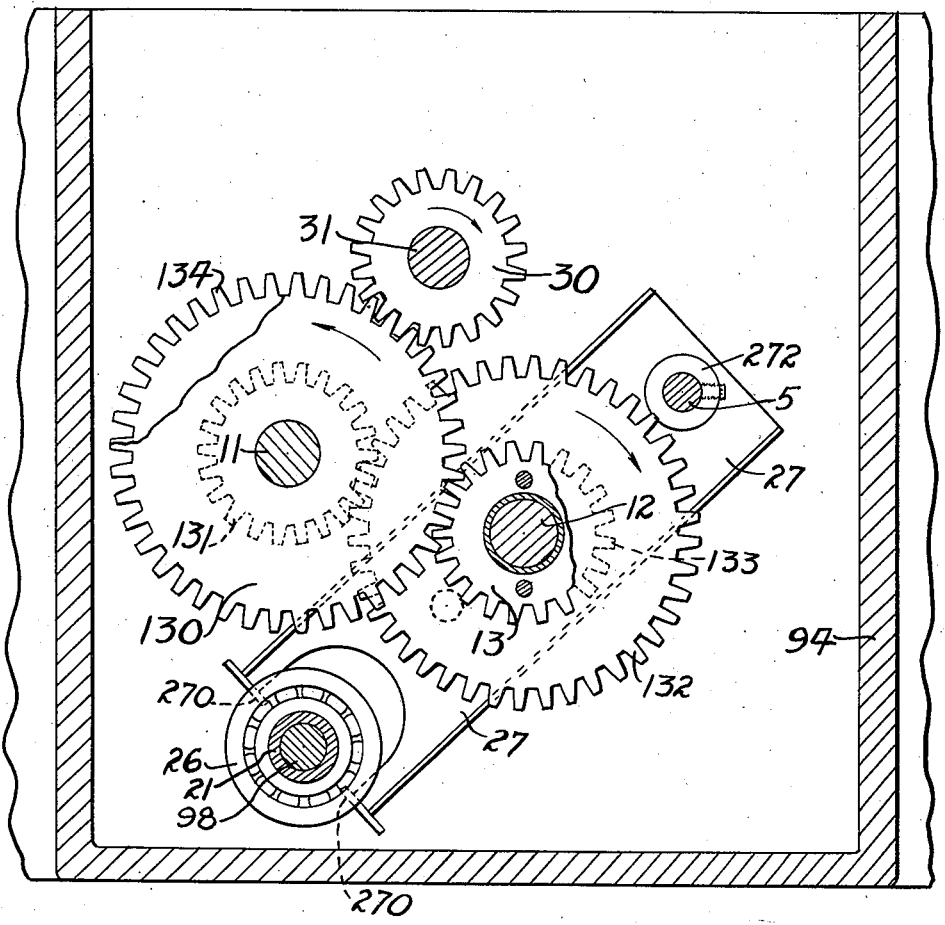

Figure 17 is a general transverse vertical section on the line 17—17 of Figure 8, illustrating in particular the drive mechanism for the mangle and for its opening and closing means.

Figure 18 is a section on line 18—18 of Figure 8, and Figure 19 is a section on line 19—19 of Figure 18, illustrating control mechanism for the mangle opening and closing devices.

General arrangement

Figure 1:
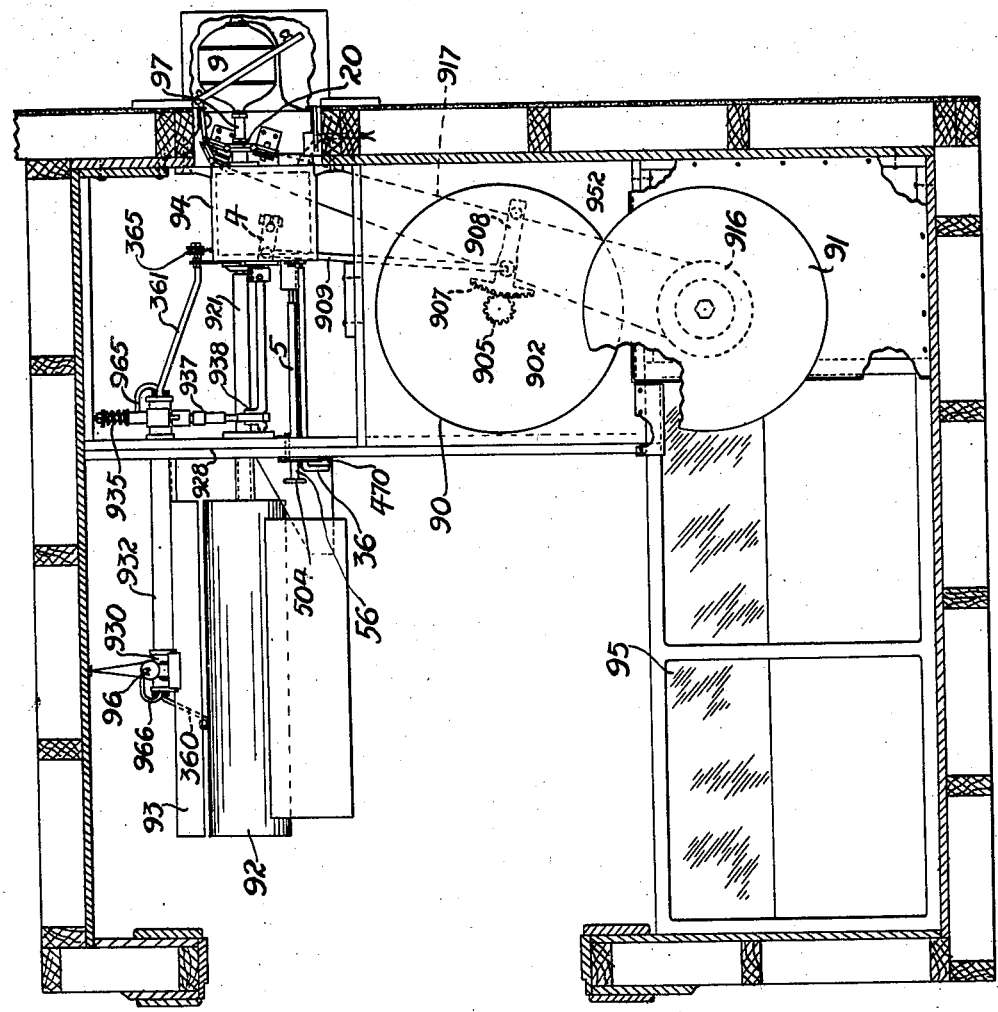
Figure 1 is a general plan view of a typical domestic laundry arrangement, showing my invention incorporated therein and associated therewith.

In the arrangement shown, a washer 90, a drier 91, a mangle roll 92, and a mangle buck or iron 93, are all to be controlled in their movements by mechanism in a casing 94 having a removable cover 943, and interposed between such devices and a motor 9, of say one-quarter horsepower. These appliances are shown in Figures 1 and 2 as grouped within a small room of a house, the motor 9 being supported upon the wall, as is the gear and control casing 94. These parts are permanently built into the house, and the washer, drier, mangle, and associated parts, together with laundry trays 95, may likewise be permanently installed (although mobile devices may be similarly driven). Accordingly, it becomes necessary that the several appliances be connected to the motor 9 through the mechanism within the casing 94, and that they be so connected that there is no danger of certain ones being operated when others are in operation; in this way overloading of the small motor which would ordinarily be employed would be prevented. Particularly is it necessary, for safety's sake, that the buck 93 of the mangle be not permitted to remain closed while other mechanism, for instance, the washer, is in operation. Accordingly, various controls to effect these results are incorporated within the mechanism within the casing 94. The individual appliances or devices are each flexibly connected to their respective drive means from the casing 94, to accommodate uneven house settlement, or inexact placement of the parts. The various control means, 36, 504, and 470 (to be described later), as shown in Figure 2, are conveniently grouped, outwardly from the casing 94, and means may be provided, such as the swinging notched lock bar 56, the several notches of which are engageable with flattened portions of the control shafts or handles to prevent their rotation, by means of which all controls may be held in inoperative position when the power plant is not in use.

While the particular construction of the washing machine, and other working units mentioned above, is not essentially a part of the control and driving mechanism, nevertheless, they are especially designed for assembly into such a group, and it will assist in understanding the control and driving mechanism if the construction of the several working machines be made clear.

The washer

The washer, generally designated by the numeral 90, is shown formed as a tub or cylindrical receiver 901, with a cover 902, and within the receiver is an upstanding shaft 903, upon which is secured within the tank 901, an agitator or gyrator 904 (see Figures 1 and 2), having incorporated therein an apertured sleeve 904' spaced from the shaft 903. This gyrator is shown as a plurality of radial blades, suitably supported upon the shaft 903. Beneath the tank 901 a small pinion 905 is secured upon the shaft 903, or upon an extension thereof which may be connected thereto by a flexible coupling, illustrated at 906. Engaged with the pinion 905 is a gear segment 907, secured upon the end of a pivoted arm 908 of some length, to which there is connected a link 909, which is reciprocated by a rotary crank arm 4 associated with the casing 94.

Reciprocation of the link 909 oscillates the arm 908, and through the intermeshing of the segment 907 and the pinion 905, the washer shaft 903 and the agitator 904 are rapidly and periodically rotated in opposite directions. The centrifugal effect on water drawn into the upper part of the apertured sleeve 904' forces water through the apertures in the lower part, and radially outward between the blades 904, and through the clothes, to cleanse them, and to cause them to circulate more freely within the tank 901.

A drain 950 is shown connected to the receiver 901, leading to a main drain 951, which may be directly connected to the trays 95. A suitable valve or plug at 900 controls the discharge of water through the drain 950.

The drier

The drier 91 (see Figures 1, 2 and 7) comprises the cylindrical casing 911, with the removable cover 912, having a shaft 913 projecting into the casing 911 from below, and having supported upon it within the tank 911 a basket 914, within which the clothes are received, and which by rapid rotation expels the water centrifugally. The walls of the basket 914 diverge downwardly, and the water discharges through apertures 914' at the bottom corner. I have found that clothes loaded unevenly—off center—in such a basket will not cause the basket to wabble as it revolves except momentarily, and it soon revolves smoothly and evenly. I attribute this to the downwardly diverging shape of the basket, probably assisted by restricting the discharge to the lowermost corner.

As shown in detail in Figure 7, a drain hole 915 may be provided in the bottom of the container 911, to discharge into the washer 90, or into the tray 95, or, intermediate these two containers, into the hollow top or table portion 952 of the washer, whence it then escapes through the drip pipe 953. The bulk of the water is quickly discharged from the clothes back into the container from which the clothes were taken when placed in the drier basket 914, and then the casing 911 is rotated to position the drain hole 915 so as to discharge the small remainder of the water, or drippings, into the table 952 and down through the drip pipe 953. In this manner the mechanical washing process is interrupted for only the time required to transfer the clothes in bulk from the washer into the drier, for by the time the next batch of clothes is put into the washer, the bulk of the suds water is returned to the washer from the drier, and the lid can be put on the washer to conserve the heat, while the drier continues to discharge the drippings. The rinsing water from the cement tray 95 can be returned completely to the tray without separate disposition of the drippings.

Upon the lower end of the shaft 913, outside of the tank 911, a pulley 916 is secured. A belt 917, passing thereabout, by mechanism associated with the casing 94 and terminating in a pulley 20, rotates the basket 914, when in use, at a high rate of speed. Suitable thrust and radial bearings, belt tightener, and suitable supports, are provided, as will be seen in Figures 2 and 7, and as good mechanical practice would dictate.

Vibration of frames, casings, etc., of the ordinary centrifugal drier is excessive and annoying. Besides creating noise it is transmitted to the building, causing it to vibrate. Such vibration can be largely eliminated or neutralized, and its effects completely nullified, by extending the shaft 913 through the opening defined by the flange 918, to be received in bearings 81 and a sleeve 810, which sleeve is encased in rubber blocks 811, supported in a base 812. This tends to hold the shaft perpendicular, free from contact with the casing 911, and its supporting table. Thus no vibration is communicated from the shaft 913 or the drier 91 due to uneven loading of the drier, and the operation is noiseless. Note, too, that the pulley 916 is rigidly connected to the shaft 913, with the plane of its belt lying within the axis of oscillation of the shaft 913, thus avoiding the communication of any vibration or uneven load upon the motor by reason of such vibration.

The mangle roll

The mangle roll 92, illustrated in Figures 1 to 5 inclusive, is mounted upon a shaft 921. To permit the shaft to turn freely within the roll, unless the roll is clutched to the shaft, a pin 922, received in a spider 923 of the mangle roll, may engage within an aperture 924 of a collar 925, secured upon the shaft 921. A spring 926 tends to urge the pin 922 out of engagement with the aperture 924, but this tendency is restrained ordinarily by a key 927 in the end of the mangle roll 92, which key forces the pin 922 to the right, as seen in Figure 4, but which may be released to disengage the pin from the aperture 924. The shaft 921 is suitably supported in a frame member 928, which may be the top rail of a bench or cabinet built into the house, and the shaft is driven by a direct flexible connection with a shaft 11 projecting from the casing 94. This shaft 921 rotates continuously so long as current is supplied to the motor 9, but the roll 92 will not continue to rotate, since the key 927 will be operated when the user is through with the mangle roll in such a way as to disconnect the drive connection at 924. Other disconnecting means might be employed, but I desire that some such shaft as 921 be continuously driven, in order that other mechanism may be connected thereto for operation.

The mangle buck

The mangle buck 93 (see Figures 1 to 6 inclusive) is connected to power means such as the crank shaft 938 at the casing 94, by means of which it may be drawn and pressed tightly against the rotating roll 92 for as long as may be desired, and it is then operated by the same power means to be withdrawn from the roll. It is also provided, as is customary, with a manual release or safety means, whereby at any time it may be released from its power presser means and thrown back away from the roll, so that, for instance, if the operator should catch a hand between the roll and the buck, with the other hand she can immediately release the buck and throw it back to avoid or minimize injury to the hand; this may also be employed to throw back the buck should the operating current fail while the buck is pressed against the roll.

Generally speaking, the buck 93, which may be hollowed for the admission of steam, or which may have an electric or gas heating element, is supported upon a head 930, which is yieldingly supported at the upper end of a standard 931, which standard is pivotally mounted at its lower end upon the floor to oscillate. Various adjustments for pressure, height, and the like, are provided, as is customary. A sleeve 932 is directly connected to the lower end of the standard 931, and forms a means for oscillating it from a lever arm 933, which I prefer to be positioned beyond the inner end of the buck 93 and roll 92. At the upper end of the arm 933 is a transversely extending sleeve 934, with adjustable tension means 935 (see Figure 6), acting upon a rod 936, slidable in the sleeve 934, and to the opposite end of the rod 936 is connected an arm 937 adjustable in length, a downwardly projecting pin 939 of which is received in an aperture in a head 937' which is journaled on the crank 938. This crank is connected to the mechanism within the casing 94, particularly the shaft 310, for movement through substantially 180 degrees at a time, thus to draw the buck 93 against the roll 92, or to remove it therefrom, as the case may be, and then to stop.

The manner of connection of the arm 937 to its head 937', and of the crank shaft 938 to its driving shaft 310, is such that the parts need not be precisely aligned, and no harm is done if, by settlement of the building, parts become misaligned.

Manual release for mangle

Figures 5 and 6 particularly illustrate the manual release, or safety, at 96. By means of this member the buck may be disconnected from the power presser means, and the buck thrown back. The active part of the mechanism may consist of a pin 961 received in the head of the lever 933 and engaging within an aperture or circumferential groove 962' in the sleeve 934 (see Figure 6). The head 936', being secured to the rod 936, moves forward therewith under the influence of the crank shaft 938. Forward movement of the sleeve 934 is restrained by the pin 961, hence the full force of the previously compressed spring 935 is applied to the lever 933, to hold the buck 93 against the roll 92. Rearward movement of the head 936', causes it to contact with the sleeve 934, relieving the pressure of the spring 935 and of the buck upon the roll. Withdrawal of the pin 961, in opposition to its spring 963, permits the head of the lever 933 to slide backward (to the left in Figure 6) over the sleeve 934, relieving the pressure of the spring 935. Such withdrawal of the pin 961 is accomplished by a link 964, connecting to a lever arm 965, which extends longitudinally of the member 932 to form a second lever arm 966, to which the manual release 96 is directly connected.

By downward pressure upon the member 96, the pin 961 is withdrawn, and continuing rearward pressure on the release 96 moves the buck 93 backward, out of engagement with the roll 92, the head being free to slide back over the sleeve 934.

Washer drive

The washer drive is best illustrated in Figures 9, 11 and 12. The main drive from the motor 9 is through the connection at 97 (Figure 8) to the shaft 98, within the casing 94. Within the casing 94, and secured upon the shaft 98, is a worm pinion 980, meshing with a worm gear 99, freely mounted upon a vertical shaft 40, but adapted to be clutched thereto. The shaft 40 projects through the bottom of the casing 94, and a removable sleeve 940, through which its extends, covers an aperture 941, through which the gear 99 and the connected bevel gear 10 may be withdrawn for replacement. At the lower end of the vertical shaft 40 is secured a crank arm 4, to which is connected the link 909 previously referred to which drives the washer.

Upon the upper end of the shaft 40 is secured a collar 41 (see Figure 11), through which extends an aperture 410 parallel to the shaft 40, in which aperture is received a clutch pin 42. The clutch pin 42 may project within a socket 43 in the gear 10, or it may be withdrawn therefrom by axial movement of a head 420, slidable lengthwise of an extension 400 of the shaft 40, to which head the pin 42 is secured. Normally, the pin is urged into the socket 43 by means of a spring 44, backed by a washer 440 on the extension 400, and engaging the head 420 directly or indirectly, but the pin may be raised out of its socket 420 to disconnect the shaft 40 from its drive gear 99 by raising a lever 45 pivoted at 450 and straddling the extension 400 to lie between the spring 44 and the head 420. Lifting of the lever 45 may be accomplished by oscillation of a dog 46 upon an oscillatable shaft 47. Movement of the shaft 47 is controlled by a handle 470 secured thereto outside of the casing 94 (Figure 9).

Adjustment of the lever 45, both as to height and leverage, may be effected by adjustment of the bent end 450 of a pin 451, which is supported in the casing 94 and held in adjusted position by lock nuts 452. The lever 45 is secured in place for easy removal and assembly, by a keeper 453.

It will now be clear that the continuously rotating shaft 98 causes continuous rotation of the shaft 40, at reduced speed because of the intermeshing of the worms 980 and 99, so long as the pin 42 is engaged in the socket 43, as shown in Figure 11, as a result of which the washing machine will be driven. However, when the dog 46 is raised by oscillation of the shaft 47, it raises the lever 45, as shown in Figure 12, and disengages the pin 42 from its socket 43; this immediately stops driving of the washing machine. The gears 99 and 10, which are connected together, merely rotate idly, so far as concerns their function of driving the washing machine.

*Drier drive*

The drier basket 914 must be rotated at a high rate of speed when it is in use. This speed may be comparable with the speed of the electric motor 9. The belt 917, as has been pointed out, extends between the pulley 916 on the drier shaft and a drive pulley 20 at the casing 94. The pulley 20 (see Figures 13 and 14) is secured upon or formed as part of a sleeve 200 mounted upon the shaft 98 in such manner that the shaft may turn within the sleeve 200 and pulley 20 without driving the same. To keep oil from exuding between the sleeve 200 and the shaft, screw threads or helical grooves, indicated at 201, may be provided upon the shaft, these not having any engagement with the sleeve 200, except as the top of the threads contact with the smooth inner bore of the sleeve. This assembly may be journaled in a bushing or bearing 202, secured in the casing 94, by the removal of which the sleeve and associated parts may be withdrawn. At its inner end the sleeve 200 is provided with a longitudinal shoulder 203, forming in effect a jaw clutch member, by means of which driving engagement is had with a corresponding shoulder of a sleeve 21 which is mounted upon the shaft 98, but which is slidable longitudinally with respect to the shoulder 203. In operation there is no disconnection at any time between these jaw clutch shoulders. The jaw clutch referred to facilitates removal of parts when necessary.

At its end opposite the sleeve 200, the sleeve 21 is provided with a flanged head 210, which has a slot or recess 211 therein, opening toward the end surface. This recess may be engaged by a pin 22 received in a bore parallel to the axis of the gear 980. The pin 22 is provided with a head 220, which limits its projection in the direction of the notch 211, though it is urged in this direction by a spring 23 surrounding the end of the shaft 98, and bearing against a washer 221. The washer also rests against the head 222 of a screw which balances it against the head 220 of the pin 22.

This screw 222 has a further purpose. In order that the worm gear 980, which is subject to wear, may be replaced with a minimum of difficulty, it is made separable from a core 983 upon which it fits, and the head of the screw 222 retains the gear upon the core. The torque may be transmitted by suitable means, such as the pin 984 received in a slot in the end of the gear 980. The pin 22 may be received in the core 983, instead of in the gear proper, although the effect is substantially the same, for the core and gear are one and the same, except for the purpose of replacement. I shall therefore refer generally to the gear 980, such reference to include the core 983, unless otherwise specifically indicated.

As seen in Figure 13, the sleeve 21 has been moved to the right, under the influence of a spring 24 surrounding the sleeve 21, and bearing upon a shoulder 241 thereon and against a shouldered sleeve 25 outside of the sleeve 21; this sleeve 25 engages the flange 210 on the sleeve 21 to limit movement of the latter sleeve. The sleeve 25 may bear against the end of the gear 980, and the tendency of the spring 24 to expand acts through the collar or flange 241 to withdraw the sleeve 21 and its flanged head 210 to the right, as it is seen in Figure 13, wherein parts are shown in disengaged position. The rotation of the gear 980 carrying the pin 22 will continue, but the end of the pin 22 clears the notch 211 of the sleeve 21, and prevents engagement therebetween. In consequence, the sleeve 21 is not rotated, nor is the sleeve 200 and the pulley 20.

When it is desired to engage the clutch pin 22 with its notch 211, the sleeve 21 is moved to the left. To accomplish this, I have shown a thrust bearing member 26 which is secured upon the sleeve 21 between the flange 241 and an upturned lug 260. Engageable with the bearing 26 is a shoulder or shoulders 270, upon a lever 27, which lever is fulcrumed at 271, between its ends, its opposite end being engageable by a collar 272 secured upon a shaft 5 supported in bearings 50 and 500, and movable axially by means of engagement of a screw threaded collar 501 upon the shaft, with threads 502 in the interior of a bushing 503, surrounding the outer or forward end of the shaft 5. Rotation of the shaft 5 may be accomplished by means of a hand wheel 504 thereon, forward of the casing 94. It may be noted that the tendency to permit exudation of grease, as the shaft 5 is screwed in and out, may be counteracted by connecting opposite sides of the screw 501 through a bore 505, within which is a non-return valve, such as a ball check 506. This permits free inward movement of grease, but blocks its outward movement.

As will be seen in Figure 14, the lever 27 has been tilted to force the thrust bearing 26 and the sleeve 21 to the left, and the pin 22 is now engaged within the notch 211. In this position of the parts there is a clutch connection between the worm pinion 980, fast on the shaft 98, and the pulley 20, and in this position of the parts the drier basket is rotated rapidly. It will be observed that this may occur, even though the washing machine is also being driven, for it may be found desirable, as has already been mentioned, to remove a batch of clothes from the washing machine to the drier to drive out most of the water and to return it to the washing machine, then to place a fresh batch of clothes in the washing machine and start them to washing, meanwhile permitting the drier to whirl, and to discharge into a sewer connection at 953 (Figure 2).

By reference to Figure 15, it will be seen that if the sleeve 21 is moved to the left at a time when the notch 211 is not in registry with the pin 22, the spring 23 will merely compress until the notch and pin come into registry, whereupon the spring will force the pin into the notch, and the clutch will then be engaged.

It will be noted that the end of the shaft 98 is received in a bearing 981, which in turn is received in a cap or bushing 982, secured in an aperture 942 of the casing, of such size that the entire shaft 98 and the gears, clutches, and the like, assembled thereon, may be withdrawn through the aperture 942 for replacement. The bushing 202, at the opposite end of the shaft 98, need not be withdrawn at this time, the jaw clutch at 203 permitting disconnection of the sleeves 21 and 200.

Mangle roll drive

Figure 1 shows the mangle roll 92 as driven by means of a shaft 921. This shaft 921 of the mangle is connected, preferably through a flexible connection, to the end of a shaft 11, which projects from the forward end of the casing 94. The gear 10, it will be remembered, is driven from the shaft 98, continuously rotated by the motor 9, by reason bf the fact that a pin or pins 990 secures this gear 10 to the worm gear 99 (see Figure 11). Continuously in mesh with the bevel gear 10 is a bevel gear 100 (see Figure 13) upon a stub shaft 12 secured by lock nuts 120 at the rear of the casing 94. The bevel gear 100 is pinned or otherwise secured to the first gear 13 of a train of gears, some of which are on the stub shaft 12, and others of which, as may be seen in Figure 8, are on the shaft 11. Thus, the driving gear 13 meshes with the gear 130, which is coupled with the smaller gear 131, both of which are on the shaft 11, and the gear 131 meshes with the larger gear 132, which is pinned to the smaller gear 133, these two latter gears being on the stub shaft 12. The gear 133 finally meshes with a larger gear 134, which is keyed or otherwise secured upon, or clutched to, the shaft 11. As shown in Figure 8, a pin 135, carried by a collar 136, clamped upon the shaft 11, is received in an aperture in the last gear 134 of the train. By these or like means, the shaft 11 is turned slowly at all times, and the mangle roll, in consequence, is always turning except as its key 927 permits disengagement of the clutch pin 922 from its socket 924 (see Figure 4).

Mangle buck operating means

The mangle buck is controlled for opening and closing movement in turn, the closing movement being carried through to a conclusion and then halted, and the opening movement being likewise carried to completion and then halted. This movement naturally must be more rapid than the slow advance of the mangle roll, but it may be driven from the same power source through the interposition of a gear 30 secured upon the shaft 31 in the gear train heretofore described, or at least, from the intermeshing of this gear 30 with one of the gears of that train,—for instance, the gear 130. From the gear 30 power is derived, while it is clutched to an extension 310 of the shaft 31, to rotate this extension 310 through 180 degrees, the extension being connected to the crank shaft 938, as has been described heretofore, constituting actuating means for the mangle buck.

For the means for clutching the gear 30 to the extension 310, reference is made to Figures 8, 11, 18 and 19. The shaft 31, upon which the gear 30 is secured, is journaled in a removable bushing 311 at the rear of the casing 94. Its rear end is backed by a threaded thrust plug 312, and its forward end is supported within an axial bore of the rotative stub shaft or extension 310 which projects at the front of the casing. Integral with or secured to the extension 310 is a sleeve 32 having an enlarged head 320 forming a shoulder 321. The sleeve also carries a forward extension 322, and the projecting extension 310, heretofore referred to. These parts 310, 32, and 320 are preferably all integral, and are received and journaled in a bushing 323 in the front wall of the casing 94.

The sleeve 32 carries a pin 33 slidable in a direction parallel to the axis of the sleeve, to engage with sockets 303 of the gear 30, under the influence of the spring 330 urging the pin into these sockets. The head 331 of the pin 33 is bent outwardly where it is engageable by a bent end 340 of a cross pin 34 received in the head 320. At the opposite side, there is provided a bent end 341 on the cross pin 34, which end 341 may be engaged by members properly positioned, such as the diametrically opposite rollers 35 bearing against the shoulder 321, supported from the depending arms 351, secured upon a cross rock shaft 352.

It being assumed that the rollers 35 are in position to engage the end 341 of the cross pin, and that the pin 33 is engaged in a socket 303, the sleeve 32, head 320, member 322, and extension 310 will rotate as a whole. Following somewhat less than 180 degrees of revolution, however, the end 341 engages with one or the other of the rollers 35, and is turned backward to cause the bent end 340 to withdraw the pin 33, and upon withdrawal of the pin 33 from its socket 303, the sleeve 32 is disengaged from the still rotating gear 30, and the advance of the sleeve 32 halts, it having completed a half cycle of 180 degrees. However, upon withdrawal of the roller 35, the bent end 341 is permitted to pass, and rotation will again continue until the sleeve 32 has completed another half revolution, when disengagement again occurs. Thus it will be seen that means are provided for rotating the sleeve 32, following each withdrawal of the roller 35, through a half cycle, and that this action may be utilized, through the connection of the crank arm 938 to the stub 310, to open the mangle buck, or to close it, in succession, and at such times as may be desired.

Oscillation of the cross rock shaft 352 to control engagement and disengagement of the clutch pin 33, may be accomplished in several ways, and I have shown two means of controlling this operation,—one operable by hand through the lever 36, and the other operable by a foot treadle 360 at the mangle. The treadle 360, as will be seen in Figures 3 and 4, extends through the member 932, and has an end 361 bent and connected by a wire or like tension member 362 and spring 363, to a chain 364 passing over a guide pulley 365, and extending, by means of a wire extension 366, into the gear box 94. These means are not directly means for oscillating the cross shaft 352, but are merely trip means to permit oscillation of that shaft and to remove from the path of an arm or lever 37 thereon an obstruction 371 which otherwise holds the shaft 352 against oscillation.

The lever 37 on the cross shaft 352 is acted upon by a light spring 370, which normally tends to pull down the end of the lever to which this spring 370 is connected. This tendency is resisted, in the inoperative position of the parts, by the pressure of the bent end 341 of the cross pin 34 under the influence of its spring 330, which is comparatively stiff, so that normally the resultant of the opposing forces of the two springs 330 and 370 is to tend to throw upward that end of the lever 37 (the left end in Figure 19) to which the spring 370 is connected, the uppermost end in Figure 8.

However, as this would result in engagement of the pin 33 with the gear 30, and thus would entail continuous rotation of the shaft 310, means are interposed to prevent such movement of the cross shaft 352, and these means, as shown, take the form of a trip lever 371, acted upon by a spring 378, and to the upper end of which is connected the chain 364, or the extension 366 thereof. The upper end of the lever 371 is normally interposed beneath the bent end 372 of the lever 37, preventing rocking of the latter, as may be seen in Figure 11, but upon withdrawal of the trip lever, pivoted at 373 (either by pulling on the chain 364 or by pushing down upon the handle 36 to operate an arm 367 inside of the gear casing to push an extension 374 of the lever 371), the cross shaft 352 is permitted to rock, and this immediately removes the roller 35 from engagement with the bent end 341 of the cross pin, permitting the pin 33 to engage the gear 30 and to commence rotation of the shaft extension 310. The lever 371 may immediately be released, but by this time the bent end 341 has passed the roller 35 which held it, and is not again engaged until the extension 310 and associated parts have completed a half revolution, when the bent end 341 engages the opposite roller 35, and the extension 310 is unclutched from the driving gear 30. This completes a half cycle, from "open" to "closed" position, or the reverse, as the case may be.

*Safety devices or cut-outs*

Reference to Figures 11 and 18 will show that the lower end of the lever 371 is provided with a toe 375, which, in one position of a cam 471 on the shaft 47, will be permitted to rock, or in another position, will not be permitted to rock. The shaft 47, it will be remembered, carries the lug 46, the position of which controls the clutching of the washer drive shaft 40 to the drive gear 10. While parts are so arranged that the washer clutch is engaged, to drive the washer, as seen in Figure 11, the lever 371 may not be rocked to operate the mangle buck. When the shaft 47 is rocked in such manner as to disconnect the clutch for the washer, then and then only the mangle buck may be operated or pressed down. This avoids the possibility of accidental closing of the mangle while the operator is busy with the washing machine, with attention diverted from the mangle, and prevents overloading of the motor, as has been mentioned.

To provide a lock against the operation of the mangle, for instance by a child stepping upon the treadle 360, means are provided whereby the trip lever 371 can not be rocked, except as the lock mechanism is in a given position. This lock mechanism may be associated with or controlled by the control shaft 5, previously referred to, and a member 510, rigidly mounted thereon, and having a shoulder 512. To this end, there is provided an arm 54 loosely mounted upon the shaft 52, and normally spring-held down against the shaft 5, this arm carrying a pin 540, which pin engages the lever 371 below its pivot 373 and acts as a stop to prevent its rocking (compare Figures 11 and 18), except as the pin is raised into registry with a notch 376. The arm 54 may only be raised into such a position when the control shaft 5 carrying the member 510 is at one extreme of its positions, namely that position which corresponds to disengagement of the drier drive pulley 20 from its driving means. In this position one of the shoulders 512 on the member 510 engages the arm 54 and raises it from the position seen in Figure 11 to that shown in Figure 18. Engagement of a spur 541 with the shoulder 512 prevents further rotation of the shaft 5 in this direction. In the position thus assumed by the stop arm 54, the lever 371 may be rocked. Further functions of the member 510 will appear hereafter.

It will be noticed, in Figure 18 particularly, (see also Figure 19), that there is a split cam 38 secured upon the sleeve 322 to rotate therewith. For the most part, this cam consists of a surface 380 which is concentric with the sleeve 322, but at diametrically opposite points is interrupted by depressions 381, preceded in the direction of rotation of the cam by inclined portions 382. Cam followers in the form of rollers 383 carried upon an arm 384, pivoted at 385, are pressed into engagement with the cam 38, the arm 384 fitting between the parts of the cam, to be steadied thereby. The pressure is achieved by means of a lever 387, 388 (Figure 11), loose on shaft 47, which presses the arm 384 upward under the influence of a heavy spring 389.

The function of this arrangement is to prevent retrograde movement of the assembly terminating in the extension 310, as might occur under the action of the stiff spring 330, and in addition to insure completion of the unclutching action, and the stopping of parts at exactly the proper position, corresponding to full "open" and "closed" positions of the mangle buck. At such times the roller 383 is received in the depressions 381, and the action of the spring 389 prevents any tendency of the extension shaft 310 to be reversely rotated by the action of spring 330 upon the bent end 340.

Upon the rocking of the cross shaft 352 by the means previously described, the clutch pin 33 is permitted to seat in a socket 303, and the extension 310 is caused to rotate; the follower 383 rides up to the circular portion 380, where it remains while the cam is rotating toward a half revolution. It then rides down the incline 382 and falls into the cam depression 381, and in effect holds the cam, and the associated parts terminating in the shaft extension 310, in the position then assumed.

In order to prevent overloading of the motor 9 by simultaneous operation of the washer or drier, and the mangle buck, means are provided so that the mangle buck may not be left closed or in the operating position and the operator go about the use of the other mechanism, as the drier or the washer. To this end, there is provided a second cam 39, also mounted upon the sleeve 322, divided into two parts as in the case of the cam 38, and receiving between the two parts a lever 390, which may conveniently be pivoted at 385. A spring 391, anchored by the extension 394 engaging the arm 384, holds a cam follower 392 to the cam 39, which is circular for the most part, being interrupted only by a single flat portion or depression 393 at a point which, when the cam follower 392 rides thereupon, corresponds to the normal or "open" position of the mangle buck. In other words, when the mangle buck, controlled by the shaft extension 310, is open, the cam follower 392 is upon the flattened portion 393 of the cam 39. This position is seen in Figure 11.

The opposite condition is seen in Figure 18. Here the follower 392 has ridden past the depression 393, and rests upon the main circular portion of the cam. This raises the lever 390, and occurs when the mangle buck is "closed" or operating, whether in process of opening or closing, or at rest, closed. The lever 390, in this operating position, operates and controls various additional cut-outs and safety devices, to prevent concurrent use of the washer and drier, as will be explained.

The swinging end of the lever 390 carries a toe 394, which is so positioned (except during such time as the follower 392 is resting upon the flat portion 393) that it will intercept and prevent oscillation of an inside switch lever 51 upon a rocking switch shaft 55. The toe 394 does not directly engage this lever 51, but may be engaged with a spring-held nose 511 thereof. In case the shaft 310 should be turned while the nose 511 lies over the toe 394 (as by manually forcing the buck towards "closed" position, causing rotation of the shaft extension 310), the toe 394 would rise, and if the nose 511 could not yield, breakage might result. However, for all practical purposes, the toe 394 engages the lever 51 and prevents its rocking through the positioning of the toe 394 in front of the nose 511, as may be seen in Figure 18.

The shaft 5, it will be remembered, is that shaft which, by axial movement obtained by screwing in or out, controls engagement or disengagement of power to the drier drive pulley 20 (see Figure 13). There is secured upon this shaft 5 a member 510, previously referred to, generally of cylindrical periphery, having helically arranged end surfaces terminating in abrupt shoulders 512, one of which, as has been described, effects movement of the arm 54 to permit tripping movement of the lever 371. This member 510 is so positioned that in the movement of the control shaft 5 axially it will engage the lower end of the inside switch lever 51 to rock the same, during that movement of the control shaft which effects clutching and unclutching of the drive connection for the drier drive pulley 20. This action can only occur when the toe 394 has been depressed into the position shown in Figure 11, and it follows, since the lever 390 is only thus de- pressed when the mangle buck is in its open position, that the drier can not be brought into operation except when the mangle buck is open.

It will be noted in Figure 16 that the lever 51 is yieldingly mounted to rock in a plane through the axis of the shaft 5 to compensate for any possible inaccuracy of its positioning relative to the member 510, so that, should it be pressed sidewise, by engagement of the end of the member 510, it will not bind, but will yield.

As has been mentioned, it is equally undesirable that the washer be operated while the mangle buck is left closed or in the operating position, and to prevent this, there is connected to the cam-controlled lever 390, by the link 520, a yielding arm 521 yieldingly mounted upon a rock shaft 52, on which shaft is secured a finger 53, which may engage a shoulder 472 upon the member 471. The member 471 upon the shaft 47 must be rocked to the right, as seen in Figure 18, in order to permit engagement of the drive connection for the washer, such position of the parts being found in Figure 11. With the finger 53 in the position shown in Figure 18 it is impossible to connect the washer to the power drive means. It can only be so connected when the cam 39 is in the position of Figure 11, which permits the arm 521 to drop, releasing the finger 53 to the action of spring 530, anchored at one end to arm 521 and at its other end to arm 54. The spring 530 causes the arm 53 to move away from its engagement with the shoulder 472, as seen in Figure 11.

It should be understood that while stress is laid on the importance of mechanism to restrict the power to one or more units only, as determined by the present design, yet such mechanism is necessary only as a means of protecting the small capacity of motor used,—a quarter horsepower motor, which can be installed and operated without any special house wiring and at the minimum cost for electrical energy. In country houses, or elsewhere, where a much larger number of machines is needed, justifying the use of a larger motor with larger installation costs, the mechanism referred to may in some cases be dispensed with, without detracting from the importance and commercial value of my invention, or from the employment of the power plant as a whole. For instance, a one-third horsepower motor would operate the washer, drier and mangle all at the same time, without any safety devices in the design to restrict the load to less than all these units at any given time.

*Electric control*

At the back of the casing 94, as may be seen in Figure 10, there is a switch box 60, from which run leads (not shown) to the motor 9. Current through these leads is controlled by the outside switch arm 6 projecting from the switch box 60, and acted upon by an extension spring 61 which tends to throw it on. Also connected to the switch arm 6 is an arm 62 which is carried upon the switch shaft 55. On this shaft 55, it will be remembered, is the inside switch lever 51 which can be rocked by the member 510 upon the control shaft 5 only when the mangle buck is open. Screwing in or out of the shaft 5 is what effects the engagement or disengagement of the drier clutch, as heretofore described.

As the shaft 5 is screwed rearwardly (to the left in Figure 16) the left shoulder 512 on member 510 pushes the end of inside switch lever 51 out away from shaft 5, (from the position shown in Figure 11) to a position of riding on the periphery of member 510 in that figure, thereby rocking the shaft 55 with its outside arm 62 to the dotted line position in Figure 10, thus opening the electric switch in box 60 and stopping the motor. However, if, before starting to screw the shaft 5 forward, the mangle buck had been closed, with the resulting interposition of toe 394 in front of the nose 511, as shown in Figure 18, then the shaft 5 can not have been screwed as above described to open the switch and stop the motor. This is an important cut-off or control feature, because it prevents the operator from cutting off the power and leaving the hot mangle buck clamped against the cloth dressing of the mangle roll 92 with the roll at rest, subjecting the roll and perhaps the house to unnecessary fire risk.

On the other hand, if the mangle buck was not closed as above described, then the member 510 having been screwed in past the lower end of the lever 51, permits the spring 61, unopposed by member 510 and the intermediate mechanism, to pull the switch lever 6 back to the right as shown in Figure 10, thus closing the switch and restarting the motor, but not until after the member 272 on the shaft 5, operating through the diagonal lever 27 and other intermediate mechanism shown in Figures 8, 13 and 14, had closed the drier clutch on the motor drive shaft (Figures 13 and 14). The purpose of cutting the current in and out by screwing the shaft 5 back and forth longitudinally, is to stop the motor while the positive clutch is being effected by means of drier clutch pin 22, Figure 13, and then to start the motor after the clutch has been completely engaged. A conical or other form of friction clutch could be employed, but all friction clutches wear out, whereas a positive clutch of the type here described, which can be used only in case the power is cut off while the clutch is being closed, will run indefinitely with little or no wear.

Operation

The construction having been described in detail, the operation may be best understood by setting forth the conditions necessary to obtain operation of the various parts. Thus, before starting the operation, it is necessary that the mangle buck be open, which means that the cam follower 392 is resting upon the flattened surface 393 of the cam 39. The control shaft 5 is so screwed that the member 510 is in its extreme forward position, so that it is not in engagement with the arm 54, as seen in Figure 18. The handle 470 is lowered, whereby the washer clutch is disengaged. All parts are now in inoperative positions, in which positions they will, in practice, have been locked when the previous washing was finished, by means of the lock bar 56 on the outside of the cabinet rail, as heretofore described.

To start the washing machine, the lock bar 56 is released, and the control handle 470 is raised, thus permitting the clutch pin 42 to drop into its socket 43. This rocks the member 471 into position where the arm 53 may not be engaged with the shoulder 472, but it will intercept and prevent rocking of the trip lever 371, to prevent tripping of the mangle buck by either the hand control or the foot control. To stop the washing machine, it is only necessary to lower the handle 470.

To operate the drier, either before or after the outside washer hand control 470 has been raised or lowered, the shaft 5 is screwed in by means of the hand wheel 504, during which action the following operations take place:

(1) The first quarter turn to the right locks the mangle trip lever 371 by dropping the arm 54 so that its pin 540 is not in registry with the notch 376.

(2) It next opens the switch 6 by raising the switch levers 51 and 62, this action occurring because of the engagement of the member 510 with the inside switch lever 51.

(3) It next effects a positive clutching between the drive shaft 98 and the drier pulley 20 by tilting of the lever 27 to engage the clutch pin 22 in a notch 211.

(4) It next releases the lever 51, permitting the arm 62 to drop, and to close the switch arm 6.

To disconnect the drier, it is necessary to screw the control shaft 5 to the left as far as it will go, or at least until it has opened and closed the switch arm 6, during which the following operations take place:

(1) The switch is first opened.

(2) The positive clutch between the pin 22 and the notch 211 is disengaged.

(3) The switch 6 is closed.

(4) By continuing the lefthand turn, the last quarter turn unlocks the mangle trip lever 371 by raising the arm 54.

The mangle roll 92, it will be remembered, rotates constantly as long as the key 927 holds it to its constantly rotating shaft 921. The operation of the mangle, therefore, resolves itself into a means for operating the mangle buck. To perform this operation, that is to close the mangle buck, see that the handle 470 is lowered, which disconnects the washer clutch. The control shaft 5 is screwed to the extreme left to disconnect the drier clutch and to raise the arm 54 into such position that the lever 371 may be rocked. The lever 371 is then rocked, either by rocking of the arm 367, by means of the handle 36, or the chain 364 is pulled by means of the treadle 360. The lower end 375 of the trip lever 371 slips under the member 471, and the upward movement of the lever 390 acts to draw the arm 53 into position to engage the shoulder 472. It is now impossible to lower the handle 470, and the cams 39, 38, and the shaft extension 310, with all associated parts, will rotate through a half cycle to close the mangle buck. Since the lever 390 is still raised, the locking finger at 53 may not be withdrawn, nor can the shaft 55 be rocked to permit movement of the member 510 past the lever 51. The washer and the drier can not be operated.

To open the mangle buck, the lever 371, which by this time has resumed its normal position, under the influence of the spring 378, is rocked by the same means as before, namely by the arm 36 or by the treadle 360. This again oscillates the lever 371 and the cross shaft 352, and the cams and associated parts again rotate through a half revolution, to complete the cycle.

When through with the mangle, the control shaft 5 is screwed about one-half turn to the right, which locks the mangle open, because of the arm 54 with its pin 540 in front of the lever 371. This locks the mangle buck open against further use, leaving the operator free to use either the washer or the drier or both, as above described.

Notice again that when the mangle is closed, with the top cam lever 39 raised, the toe 394 obstructs the approach of the nose 511 of the lever 51, making it impossible to open the switch by screwing the control shaft 5 to the right. Therefore, it is impossible to open the switch and shut off the power while the hot mangle buck is in contact with the roll.

It is desired to point out that all shafts, with the exception of the cross rock shaft 352 and the vertical washer drive shaft 46, are parallel, extending from front to rear of the casing 94, so that they are least in the way of other shafts, and are removable or adjustable through the front or back of the casing. This makes for compactness, and the shafts 352 and 46, referred to above, do not detract from the advantage arising from the arrangement of the other parts, since they are, respectively, the uppermost and the lowermost of the shafts. One is accessible by removing the cover 943, and the other through the bottom of the casing 94, upon removal of the sleeve or bushing 940. All controls are grouped at one side of the casing, where their interconnection is facilitated, and the operating and driving parts, clutches, etc., are disposed at the other side of the casing. Control shafts are capable of assembly outside of the casing, and may be installed as a unit by reason of the employment of adjustable, inwardly projecting pivot trunnions, as seen at 353, for example. Electrical devices are outside of the casing 94, and this casing can be filled with grease, to lubricate the various parts requiring it.

What I claim as my invention is:

1. Mechanism of the character described, comprising a plurality of devices, a driving motor of limited capacity, individual means adapted to connect each of said devices to the motor, two or more of said means being adapted to be connected simultaneously, and means to prevent connection of devices at any one time in excess of the capacity of the motor.

2. Mechanism of the character described, comprising a plurality of devices, a driving motor of limited capacity, individual means for connecting each of said devices to the motor, and means operable by and during the connection of one device to positively interdict connection of other devices, provided that the combined load would be in excess of the capacity of the motor.

3. Mechanism of the character defined, comprising a plurality of devices, a driving motor, means for operatively connecting each of said devices to the motor, one of said devices being repeatedly operable through a fixed series of consecutive operations, and means operable to prevent connection of other of said devices to the motor before completion of such series of operations.

4. The combination of claim 3 and further means to prevent disconnection of the driving motor circuit before completion of such series of operations.

5. Mechanism of the character defined, comprising a plurality of devices, a driving motor, means for operatively connecting each of said devices to the motor, the connection for one such device being repeatedly operable through two intermittent half-cycles, and means operable during a cycle of operation of said latter device, consisting of two half-cycles, to prevent connection of the remainder of said devices to the motor.

6. Mechanism of the character described, comprising a device to be driven, a driving motor, positively engageable clutch means for effecting a driving engagement between the motor and device, a motor switch, clutch control means, and means associated with said clutch control means for opening the switch during the action of engaging said clutch, and for closing the switch after the clutch is engaged.

7. Mechanism of the character described, comprising three devices and a common driving motor for said devices, individual clutch means to connect each of said devices to the common motor, and safety means disposed to intercept two of said clutch means by and during engagement of the remaining clutch means, and further disposed to intercept said last mentioned clutch means during engagement of either or both of said two clutch means.

8. Mechanism of the character described, comprising individual actuating means for a washer, a drier, and a mangle buck movable between open and closed positions, a common driving motor for the aforesaid drive means, separate clutch means engageable to drive the respective individual actuating means for the washer and the drier from the motor, a clutch means engageable to connect the motor to the buck actuating means, to move the buck to open position and then disengage, or to closed position, and then disengage, and safety means disposed to prevent engagement of the clutch means of either the washer or drier actuating means until the buck actuating means has been moved to correspond to open position of the buck, and its clutch means disengaged.

9. In mechanism of the character described, in combination, a rotatable shaft, an actuating means movable through two half cycles, from normal to operative position and return to normal position, a clutch and clutch-operating means for said shaft, and a clutch and clutch-operating means entirely separate and independent of said first clutch and clutch operating means for said actuating means, and means interengageable between the respective clutch-operating means to prevent the engagement of either clutch during the engagement of the other.

10. The combination of claim 9, and means preventing engagement of the shaft clutch operating means during disengagement of the actuating means clutch in operative position.

11. The combination of claim 9, the clutch operating means for the actuating means including an oscillatable lever, the shaft clutch operating means including a rock shaft, and the interengageable means including a member upon the rock shaft to intercept said lever and prevent its oscillation while the shaft clutch means are in engagement.

12. The combination of claim 9, the shaft clutch operating means including a rock shaft, the interengageable means including a part round, flattened member on said rock shaft, and the clutch operating means for the actuating means including an oscillatable lever having a hooked end engageable with the round portion of said member to prevent oscillation of the lever during engagement of the shaft clutch, rocking of said rock shaft to disengage the shaft clutch thus moving the flattened portion of said member into registry with said hooked end of the lever, to permit oscillation of the lever and engagement of the actuating means clutch.

13. The combination of claim 9, the shaft clutch operating means including a rock shaft, and the interengageable means including means associated with the clutch operating means for the actuating means to prevent rocking of said rock shaft to engage the shaft clutch except when the buck is in normal position.

14. The combination of claim 9, the shaft clutch operating means including a rock shaft, the clutch operating means for the actuating means including an oscillatable finger, and the interengageable means including a shouldered member carried upon the rock shaft, and means responsive to initiation of operative movement of the actuating means to move said finger into engagement with said shouldered member, thereby to prevent engagement of the shaft clutch until the actuating means has again returned to the normal position.

15. In mechanism of the character described, a rotating drive shaft and drier drive means including a rotatable drive pulley loose upon said shaft, a member fast upon said shaft and a sleeve adapted to contact with the end of said member, a second sleeve having shouldered engagement with, and slidable within, the first sleeve, said second sleeve and said member having complemental clutch means engageable by movement of the second sleeve towards the member, means normally holding said second sleeve with its clutch means out of engagement with the complemental clutch means, and means operable to engage them, and an operative connection between said second sleeve and the drier drive pulley.

16. The combination of claim 15, and a casing enclosing the several parts, the drive shaft at one end being received in a removable bushing in the wall of said casing of a size to permit endwise removal of the member and sleeves referred to, and the operative connection between the second sleeve and the drive pulley including a longitudinally separable jaw clutch.

17. The combination of claim 15, and a casing enclosing the several parts, the drive shaft at one end, and the drier drive pulley at the other end, being receivable each in a removable bushing in the wall of said casing of a size to permit endwise removal of the respectively associated parts, and the operative connection between the second sleeve and the drive pulley including longitudinally separable jaw clutch members.

18. The combination of claim 15, the member referred to having a pin extending parallel to the axis of rotation, and spring-held towards the sleeves, the second sleeve having a notch in its end to receive the projecting end of said pin, when the sleeve is pressed towards said member.

19. The combination of claim 15, and in combination therewith, a lever engageable at one end with the second sleeve to move it towards the member referred to, a compression spring between said lever and the first sleeve to move the second sleeve in the opposite direction, a control shaft mounted for axial movement, and a member thereon engageable with said lever to rock the same.

20. The combination of claim 15, and in combination therewith, a mangle buck opening and closing means including a shaft rotatable through one revolution to complete a cycle, a control shaft operatively connected to the second sleeve and axially movable to control its movements, and means operable when the mangle buck opening and closing means are in operative position, to prevent such axial movement of the control shaft as would initiate operation of the drier.

21. The combination of claim 15, and in combination therewith, a mangle buck opening and closing means including a shaft rotatable through one revolution to complete a cycle, a threaded control shaft operatively connected to the second sleeve to control its movements, a shouldered member on said control shaft, and a stop means controlled from the mangle buck opening and closing means, and positioned to stop rotation of the control shaft by engagement of the shouldered member, thereby to prevent engagement of the drier clutch.

22. In mechanism of the character described, a rotating drive shaft and washer drive means including a rotatable shaft, means including a clutch for operatively connecting said drive shaft to said shaft, an actuating shaft movable from a normal position to an operative position, and return to the normal position to complete a cycle, clutch means adapted to connect the actuating shaft with the drive shaft, and automatically disengageable at the end of each half-cycle, and means to prevent engagement of the washer drive clutch except as the actuating shaft is in the normal position.

23. In mechanism of the character described, a rotating drive shaft and washer drive means including a rotatable crank shaft, means including a clutch for operatively connecting said drive shaft to said crank shaft, a mangle buck opening and closing means including a shaft movable between a normal position corresponding to "open" position of the buck to a "closed" position, and return to "open" position to complete a cycle, clutch means adapted to connect the buck-operating shaft with the drive shaft, and automatically disengageable at the end of each half-cycle, and means controlled by said washer clutch means to prevent engagement of the buck-operating clutch while the washer clutch is in engagement.

24. In mechanism of the character described, actuating means including a driven shaft rotatable through a half revolution from normal to operative position, and through another half revolution to normal position again, a driven member upon said shaft, and a driving member aligned therewith, an axially movable pin carried by said driven member, a spring tending to project said pin towards the driving member, said latter member having sockets to receive the pin and to constitute therewith a clutch, a pair of diametrically opposite striker members, means carried by said driven member in position to be engaged by said striker members in turn, and operatively connected to withdraw the clutch pin upon actuation by a striker member, and means for moving said striker members from a position ready to engage their complemental means into a position out of engagement therewith, to permit projection of the clutch pin.

25. The combination of claim 24, and in combination therewith, independent operating means operatively connected to be driven from the same source as the actuating means, and means controlled by the actuating means for preventing actuation of such operating means except as the actuating means is in normal position.

26. The combination of claim 24, and in combination therewith, a cam rotatable with the driven member, a lever bearing upon and controlled in position by said cam, the cam having a single depression corresponding to normal position, independent operating means operatively connected to be driven from the same source as the actuating means, and including a clutch, and means controlled by said lever to prevent engagement of said latter clutch except as the cam, lever, and associated parts are in normal position.

27. The combination of claim 24, and in combination therewith, a cam rotatable with the driven member and having diametrically opposite depressions corresponding respectively to normal and to operative positions, and a cam follower spring pressed into said cam to fix the driven member in each position in turn.

28. The combination of claim 24, and in combination therewith, a rock shaft and arms thereon carrying said striker members, a lever on said shaft, the clutch pin spring tending to throw said striker members away from the driven member, and a trip lever normally engaged with said first lever to prevent rocking of the rock shaft.

29. The combination of claim 24, and in combination therewith, a rock shaft and arms thereon carrying said striker members, a lever on said shaft, the clutch pin spring tending to throw said striker members away from the driven member, and a trip lever normally engaged with said first lever to prevent rocking of the rock shaft, washer drive means and drier drive means, clutch mechanism and control mechanism for each of said washer and said drier drive means, and means controlled by each of said washer and drier control mechanism to prevent releasing movement of said trip lever until the washer clutch and the drier clutch mechanisms have been released.

30. In mechanism of the character described, mangle buck-operating means including a clutch, a rock shaft oscillatable to engage said clutch, an arm upon said rock shaft, a trip lever normally engageable with said arm to prevent oscillation of the rock shaft, a second appliance and operating means therefor including a rotatable control shaft, a second arm and stop means thereupon normally engaged with complemental stop means upon the trip lever to prevent the latter's movement, and means upon said control shaft for swinging the arm carrying said stop to bring the stop out of registry with the stop upon the trip lever, thereby to permit movement of the latter.

31. In mechanism of the character described, mangle buck-operating means including a rotary shaft and a clutch controlling rotation thereof, a cam having a single depression rotatable with said shaft, a second appliance and operating means therefor including a rotatable control shaft, a control member thereon, a lever engageable by said control member upon rotation of said control shaft, to be rocked thereby prior to initiation of operation of the second device, and means controlled by said cam for blocking the rocking of said lever except when the depression is in position corresponding to "open" position of the mangle buck.

32. In mechanism of the character described, mangle buck-operating means including a rotary shaft and a clutch controlling rotation thereof, a cam having a single depression rotatable with said shaft, a second appliance and operating means therefor including a rotatable control shaft, a control member thereon, a lever engageable by said control member upon rotation of said control shaft, to be rocked thereby prior to initiation of operation of the second device, an arm and a cam follower thereon engageable with said cam to raise the arm except when the follower is in registry with the depression, and a nose upon said arm positioned, when the arm is raised, to intercept and prevent rocking of said lever, and permitting such rocking when the arm is lowered.

33. In mechanism of the character described, mangle buck-operating means including a rotary shaft and a clutch controlling rotation thereof, a cam having a single depression rotatable with said shaft, a second appliance and operating means therefor including a rotatable control shaft, a control member thereon, a lever engageable by said control member upon rotation of said control shaft, to be rocked thereby prior to initiation of operation of the second device, and means controlled by said cam for blocking the rocking of said lever except when the depression is in position corresponding to "open" position of the mangle buck, a motor for driving said shaft through said clutch, a switch arm normally on, and controlling the circuit through said motor, and means operatively connecting said lever and said switch arm, to move the latter into "off" position upon rocking the said lever.

34. In mechanism of the character described, mangle buck operating means including a rotary shaft and a clutch controlling rotation thereof, a cam having a single depression and rotatable with said shaft, a trip lever oscillatable to permit engagement of said clutch, a second appliance and operating means therefor including a rock shaft, an arm and a cam follower thereon engageable with said cam to raise the arm except when the follower is engaged with the depression, corresponding to "open" position of the buck, an oscillatable finger and operative connection thereto from said arm to move the finger as the arm is raised or lowered, and means upon said rock shaft engageable by said finger to prevent rocking of the shaft into operative position except when the cam follower is engaged with the cam depression, in the "open" position.

35. In a mechanism of the character described, a rotating drive shaft, a plurality of drive means operatively connected to be driven from said shaft, independent clutch means between said respective drive means and said shaft, an actuating shaft rotatable through one revolution to complete a cycle from normal through operative position to normal position again, and means to prevent engagement of any of said clutches except as the actuating shaft is in normal position.

36. In a mechanism of the character described, a rotating drive shaft, a plurality of drive means operatively connected to said shaft, an actuating shaft rotatable through a half revolution from normal to operative position, and through another half revolution to normal position again to complete a cycle, clutch means adapted to connect said actuating shaft with the drive shaft, and automatically disengageable at the end of each half-revolution, and means controlled by said actuating shaft to prevent the engagement of other drive means driven from said drive shaft except as said actuating shaft is in normal position.

37. In a mechanism of the character described, a rotating drive shaft, drive means including a rotatable shaft, means including a clutch for operatively connecting said drive shaft to said shaft, an operating means including a shaft movable through an operating cycle consisting of a movement from an inoperative position to an operative position and return to the inoperative position, clutch means adapted to connect said last-mentioned shaft to said drive shaft, and automatically disengageable at the end of each half-cycle, and means controlled by said operating means to prevent engagement of said first-mentioned clutch except as said operating means is in the inoperative position.

38. Mechanism of the character described, comprising a plurality of devices, a driving motor of limited capacity, independent individual clutch means adapted to connect each of said devices to the motor, each of said clutch means including a member connected to the motor and a member connected to the respective device, and means interconnecting the several clutches to prevent connection of devices at any one time in excess of the capacity of the motor.

39. Mechanism of the character described, comprising a device to be driven, an electric motor to drive said device, clutch means for effecting a driving engagement between the motor and device, clutch-operating means, circuit-breaking means, and means interengageable between said clutch-operating means and said circuit-breaking means to maintain the circuit-breaking means in open position by and during movement of the clutch-operating means to engage said clutch.

40. The combination of a driving shaft, an actuating means movable through two half cycles, from normal to operative position and return to normal position, a clutch adapted to interconnect said driving shaft and said actuating means, clutch operating means therefor, means to maintain said clutch in engagement during movement of said actuating means between such two positions, and means to automatically disengage said clutch upon disposition of said actuating means in either one of such positions.

41. The combination of an electric driving motor, a shaft driven thereby, an actuating means movable through two half cycles, from normal to operative position and return to normal position, and adapted to be driven from said shaft, switch means for the motor circuit, and means controlled by said actuating means to interdict movement of said switch to the closed position when said actuating device is in the operative position.

WARREN HULL.